US012677834B2

(12) United States Patent
Aldossary et al.

(10) Patent No.: US 12,677,834 B2
(45) Date of Patent: Jul. 14, 2026

(54) **SILVER SILICALITE ZEOLITE NANOMATERIALS FOR REDUCING *CANDIDA AURIS* BIOFILMS**

(71) Applicant: Imam Abdulrahman Bin Faisal University, Dammam (SA)

(72) Inventors: Hanan A. Aldossary, Dammam (SA); Suriya Rehman, Dammam (SA); B. Rabindran Jermy, Dammam (SA); Sayed Abdulazeez, Dammam (SA); J. Francis Borgio, Dammam (SA); Ebtesam Abdullah Al-Suhaimi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 497 days.

(21) Appl. No.: 18/313,025

(22) Filed: May 5, 2023

(65) Prior Publication Data

US 2024/0365787 A1 Nov. 7, 2024

(51) Int. Cl.
*A01N 59/00* (2006.01)
*A01N 25/12* (2006.01)

(52) U.S. Cl.
CPC ............. *A01N 59/00* (2013.01); *A01N 25/12* (2013.01)

(58) Field of Classification Search
CPC ..................................................... C09D 1/00
See application file for complete search history.

(56) References Cited

U.S. PATENT DOCUMENTS

| | | |
|---|---|---|
| 2012/0021034 A1 | 1/2012 | Zink et al. |
| 2019/0223445 A1 | 7/2019 | Seo et al. |

FOREIGN PATENT DOCUMENTS

| | | |
|---|---|---|
| CN | 101816302 A | 9/2010 |
| WO | 2019/245897 A1 | 12/2019 |

OTHER PUBLICATIONS

Aldossary et al. Therapeutic Intervention for Various Hospital Setting Strains of Biofilm Forming Candida auris with Multiple Drug Resistance Mutations Using Nanomaterial Ag-Silicalite-1 Zeolite. Oct. 2022.*
Kirk Wersland ; Eliminating Chronic Systemic Candidiasis ; Integrated Wellness ; 9 Pages.
Lara et al. ; Inhibition of Candida auris Biofilm Formation on Medical and Environmental Surfaces by Silver Nanoparticles ; ACS Applied Materials Interfaces 12, 19 ; Jan. 16, 2020 ; 9 Pages.

* cited by examiner

*Primary Examiner* — Sarah Alawadi
(74) *Attorney, Agent, or Firm* — Oblon, McClelland, Maier & Neustadt, L.L.P.

(57) ABSTRACT

A method of reducing an amount of a *Candida auris* biofilm on a surface, including, contacting a composition with the surface, where the composition reduces the amount of the *Candida auris* biofilm by at least 50% 24 hours after contacting the composition with the surface. The composition includes silicalite, and silver nanoparticles isomorphously substituted in a matrix of the silicalite, where an atomic ratio of Si to Ag is in a range of 25:1 to 1:1. The particles of the composition have a spherical shape and an average size of 400-800 nm.

19 Claims, 31 Drawing Sheets

Specification includes a Sequence Listing.

| Element | Weight % | Atomic % |
|---|---|---|
| C K | 10.55 | 16.59 |
| Ag L | 4.65 | 0.81 |
| O K | 49.87 | 58.85 |
| Na K | 1.80 | 1.48 |
| Si K | 33.13 | 22.27 |

Ag-Silicalite-1

4wt%Ag/TiZSM-5

4wt%Ag/TiZSM-5

Ag-Silicalite-1

Ag-Silicalite-1

CA1 48h

CA6 48h

CA 15

CA 19

SILVER SILICALITE ZEOLITE NANOMATERIALS FOR REDUCING *CANDIDA AURIS* BIOFILMS

REFERENCE TO A SEQUENCE LISTING

A Sequence Listing, submitted as an XML file and compliant with WIPO Standard ST.26, forms part of the present application. The Sequence Listing is identified as follows: File name "546194US.xml," created on Dec. 1, 2025, with a size of 27,369 bytes. It is incorporated by reference for all purposes.

STATEMENT OF PRIOR DISCLOSURE BY INVENTOR

Aspects of the present disclosure are described in H. A. Aldossary, S. Rehman, B. R. Jermy, R. AlJindan, A. Aldayel, S. AbdulAzeez, S. Akhtar, F. A. Khan, J. F. Borgio, and E. A. Al-Suhaimi, "Therapeutic Intervention for Various Hospital Setting Strains of Biofilm Forming *Candida auris* with Multiple Drug Resistance Mutations Using Nanomaterial Ag-Silicalite-1 Zeolite"; Pharmaceutics; Oct. 21, 2022; 14; 10; 2251, incorporated herein by reference in its entirety.

STATEMENT OF ACKNOWLEDGEMENT

The Authors extend their appreciation to Deputyship for Research & Innovation, Ministry of Education in Saudi Arabia for funding this research work.

BACKGROUND

Technical Field

The present disclosure is directed to nanomaterials for treating biofilms, particularly, silver silicalite zeolite nanomaterials for treating *Candida auris* biofilms.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Antibiotic treatment is the major therapy against bacterial infection, yet its abundant and unrealizable targets and the deficiency of new antibiotics and vaccines are the leading causes of the increased resistance of infectious bacteria. Bacteria improve their resistance against antibiotics by different mechanisms, such as, reducing the permeability of the cell membrane, the inactivation of enzymes, target protection or overproduction, changing the receptor site, and rising outflow as a result of the over-expression of efflux pumps. As a result, bacteria change to multidrug-resistant bacteria (MDR).

Biofilm matrices are another complex mechanism of bacterial resistance. They are a three-dimensional accumulative gathering of microbes which can also adhere to a surface. These adherent cells become embedded within an extracellular matrix that is composed of extracellular polymeric substances (EPSs). The cells within the biofilm produce the EPS components, which are typically a polymeric conglomeration of extracellular polysaccharides, proteins, lipids and DNA. The biofilm supports the microbe capable of countering drugs and antibiotics. The formation of biofilm by MDR microbes is correlated to the high tolerance of antibiotics by bacteria. Once antibiotic resistance suppresses the antibiotic inhibitory effect on pathogenic bacteria, these resistant bacteria proliferate with antibiotic treatment. MDR pathogens are serious and outstanding risks globally, which creates an urgent need for novel bio-effective substitutions for fighting aggressive MDR attacks.

The genus *Candida* is one of the most known types of infectious yeast. Among them, *C. auris* is an emerging multi-drug resistance (MDR) pathogen with high mortality rates in humans. It belongs to the *Clavispora* clade of the Metschnikowiaceae family that commonly infects human blood circulation, the digestive system, skin, wounds, and other organs. *C. auris* is mainly resistant to antifungal agents, resulting in a mortality rate of up to 60%. The formation of biofilms is the basic pattern of most fungi, including *C. auris*, which is significant in developing infections and inhabiting mainly on materials such as implants, including catheters, in hospital settings. Such biofilms can be resistant to several antimicrobials due to their complex colony-forming ability to produce an extracellular matrix and other regulatory mechanisms, such as quorum-sensing molecules.

Antifungal agents play a main role in inhibiting the mechanism of fungal cell wall synthesis as fungal cells are wrapped in carbohydrates, which are essential for the growth and fungi survival. Antifungal therapy used in healthcare is limited and is mainly based on azole agents (triazoles and imidazoles), lipopeptides (echinocandins), and polyenes (amphotericin B, mycostatin (nystatin), and natamycin). However, drug resistance, low bioavailability (5% absorption), and the toxic effects of these drugs are a limitation.

Although several reported antimicrobials have been developed in the past for treating *C. auris*, their synthesis techniques and expected microbicidal activity are far from the clinical treatment demands. Accordingly, the present disclosure aims to develop a cost-effective approach to developing a *C. auris* treatment that is cost effective for clinical-scale applications, with improved efficacy, biocompatibility, and ease of multifunctionality.

SUMMARY

In an exemplary embodiment, a method of reducing an amount of *Candida auris* biofilm on a surface is described. The method includes contacting a composition with the surface, wherein the composition reduces the amount of the *Candida auris* biofilm by at least 50% 24 hours after the contacting, wherein the composition comprises silicalite; and silver nanoparticles, wherein a atomic ratio of Si to Ag is in a range of 25:1 to 1:1, wherein particles of the composition have a spherical shape and an average size of 400-800 nm, and wherein the silver nanoparticles are isomorphously substituted in a matrix of the silicalite.

In some embodiments, the composition has a surface area of 300-400 square meters per gram ($m^2/g$).

In some embodiments, the composition has a pore volume of 0.05 to 0.5 cubic centimeters per gram ($cm^3/g$).

In some embodiments, the composition has an average pore size distribution of 1-5 nanometers (nm).

In some embodiments, the composition has both mesopores and micropores.

In some embodiments, the mesopores and the micropores have a pore volume ratio of 1.5:1 to 1:1.

In some embodiments, the composition is at least 50% crystalline.

In some embodiments, the composition further includes a template.

In some embodiments, the composition, comprises less than 20 wt. % of the template, based on the total weight of the composition.

In some embodiments, the template is tetrapropyl ammonium hydroxide.

In some embodiments, the particles of the composition are not agglomerated.

In some embodiments, the composition includes 2-7 wt. % Ag, 40-60 wt. % 0, 1-3 wt. % Na, 5-15 wt. % C, and 25-40 wt. % Si.

In some embodiments, the silver nanoparticles have a cubic crystal system.

In some embodiments, the silver nanoparticles are substantially spherical and have an average diameter of 1-20 nm.

In some embodiments, the silver nanoparticles are not agglomerated in the composition.

In some embodiments, the surface is in a hospital.

In some embodiments, the composition reduces the amount of the *Candida auris* biofilm by at least 80% 24 hours after contacting the composition with the surface.

In some embodiments, the composition attaches to a cell surface and at least partially penetrates a *Candida auris* cell.

In some embodiments, the composition is made by a method including adding silica in an alkaline solution to form a first solution; adding a silver salt into the first solution to form a second solution; adding a template into the second solution to form a third solution; hydrothermally treating the third solution for 10-100 hours to form a precipitate; and filtering, drying, and calcining the precipitate to obtain the composition.

The foregoing general description of the illustrative present disclosure and the following The detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 3A. The three sequences in the top box are those of SEQ ID NO: 14, SEQ ID NO: 15 and SEQ ID NO: 14. The two sequences at the bottom of the first sheet of this figure are SEQ ID NO: 15 and SEQ ID NO: 14. The two sequences on the second sheet of FIG. 3A are each given by SEQ ID NO: 15. The amino acid sequences shown in FIG. 3A, first sheet are each given by SEQ ID NO: 24.

FIG. 3B. The three sequences in the top box are those of SEQ ID NO:16, SEQ ID NO: 17 and SEQ ID NO: 16. The two sequences at the bottom of this figure are given by SEQ ID NO: 16. The amino acid sequences shown in FIG. 3B are each given by SEQ ID NO: 25.

FIG. 4A. The three sequences in the top box are those of SEQ ID NO:18, SEQ ID NO: 19 and SEQ ID NO: 18. The two sequences at the bottom of this figure are given by SEQ ID NO: 19. The amino acid sequences shown in FIG. 4B are each given by SEQ ID NO: 26.

FIG. 4B. The three sequences in the top box are those of SEQ ID NO:20, SEQ ID NO: 21 and SEQ ID NO: 20. The two sequences at the bottom of this figure are given by SEQ ID NO: 21 and 20, respectively. The amino acid sequences shown in FIG. 4B are each given by SEQ ID NO: 27.

DETAILED DESCRIPTION

Figure 1:
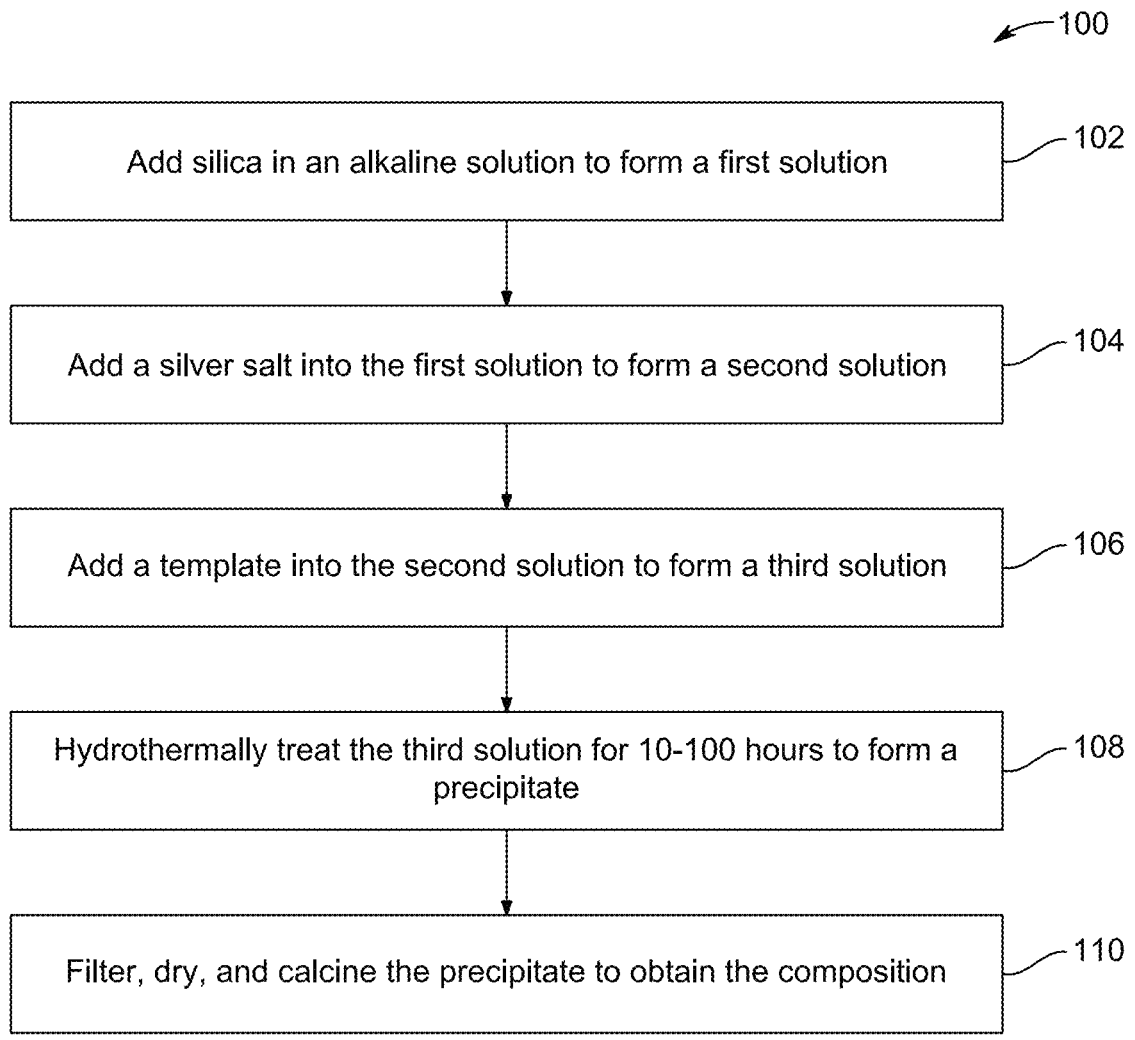
FIG. 1 is a flowchart depicting a method of making a composition, according to certain embodiments.

In the drawings, reference numerals designate identical or corresponding parts throughout the several views. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Where a numerical limit or range is stated herein, the endpoints are included. Also, all values and subranges within a numerical limit or range are specifically included as if explicitly written out.

Aspects of the present disclosure are directed to a method of reducing biofilms on a surface using a composition of silicalite and silver nanoparticles. A change in morphogenesis of the cells, in addition to the reduction in the number of cells, was achieved upon application of the composition. The presence of a high surface area and the uniform dispersion of nanosized Ag species display enhanced antimicrobial activity, and therefore it has great potential against emerging multidrug-resistant microbes.

According to an embodiment of the present disclosure, a method of reducing the amount of *Candida* biofilm on a surface is described. In an embodiment, the surface is a hospital surface or any other medical treatment facility. The composition of the present disclosure may be contacted with devices, such as tubing and other surface medical devices, such as a urinary catheter, mucous extraction catheter, suction catheter, umbilical cannula, contact lenses, intrauterine devices, intravaginal and intraintestinal devices, endotracheal tubes, bronchoscopes, dental prostheses and orthodontic devices, surgical instruments, dental instruments, tubing, dental water lines, dental drain tubes, fabrics, paper, indicator strips (e.g., paper indicator strips or plastic indicator strips), adhesives (e.g., hydrogel adhesives, hot-melt adhesives, or solvent-based adhesives), bandages, tissue dressings or healing devices and occlusive patches, and any other surface devices used in the medical field. Devices may include electrodes, external prostheses, fixation tapes, compression bandages, and monitors of various types. Medical devices also include any device that may be placed at the insertion or implantation site such as the skin near the insertion or implantation site, and which include at least one surface which is susceptible to colonization by biofilm-embedded microorganisms. In one specific embodiment, a composition of the invention is integrated into an adhesive, such as tape, thereby providing an adhesive, which may prevent the growth or proliferation of biofilm-embedded microorganisms on at least one surface of the adhesive. Medical devices for the present invention include surfaces of equipment in operating rooms, emergency rooms, hospital rooms, clinics, and bathrooms. The surface may be of various objects such as pipelines, counter/tabletops, filters, water lines, and tiles of various kinds.

In an embodiment, the surface is located in a hospital and had previously been exposed to a *Candida* species. The *Candida* species then forms a biofilm on said hospital surface over a period of time, preferably 1 minute to 100 days, more preferably 1 hour to 10 days, or 24 hours to 5 days. In some embodiments, the composition may be contacted onto the surface prior to exposure to a *Candida* species, thereby preventing the formation of a biofilm.

The method includes contacting a composition with the surface. The contacting may occur for 1-72 hours, preferably 5-48 hours, or 10-24 hours. In some embodiments, the contacting is at room temperature (about 20-22° C.), or the surface is heated to a temperature of 25-40° C., preferably 30-35° C. As used herein, "contacting" includes, but is not limited to, soaking, rinsing, flushing, submerging, and washing.

In some embodiments, the composition is a powder and the powder is contacted with the surface. In some embodiments, the composition is included in a cleaning formulation in the form or a liquid or gel. In some embodiments the cleaning formulation further includes other components such as cleaning compounds, germicides, antimicrobials, bleaches, fragrances, surface modifiers, stain preventers, and combinations thereof. In some embodiments, at least one solvent can be present in the cleaning formulation to assist in blending of composition and other components. Examples of solvents suitable for use are aliphatic alcohols of up to 8 carbon atoms; alkylene glycols of up to 6 carbon atoms; polyalkylene glycols having up to 6 carbon atoms per alkylene group; mono- or dialkyl ethers of alkylene glycols or polyalkylene glycols having up to 6 carbon atoms per glycol group and up to 6 carbon atoms in each alkyl group; and mono- or diesters of alkylene glycols or polyalkylene glycols having up to 6 carbon atoms per glycol group and up to 6 carbon atoms in each ester group. Specific examples of solvents include t-butanol, t-pentyl alcohol; 2,3-dimethyl-2-butanol, benzyl alcohol or 2-phenyl ethanol, ethylene glycol, propylene glycol, dipropylene glycol, propylene glycol mono-n-butyl ether, dipropylene glycol mono-n-butyl ether, propylene glycol mono-n-propyl ether, dipropylene glycol mono-n-propyl ether, diethylene glycol mono-n-butyl ether, diethylene glycol monomethyl ether, dipropylene glycol monomethyl ether, triethylene glycol, propylene glycol monoacetate, glycerin, ethanol, isopropanol, dipropylene glycol monoacetate, and water.

In some embodiments, the cleaning formulation is contacted directly to a surface using any suitable applicator device, such as a pump or syringe-type device, manual, pressurized, or mechanized, aerosol, or sprayer. The consumer may activate the applicator for application of the composition directly to a surface without the need to touch the surface. The amount and location(s) of the cleaning formulation may be chosen by the user.

Although the description, and the examples herein provided, evaluate the potential of the composition of the present disclosure against *C. auris* biofilms, the method of the present disclosure may be adapted to treating biofilms caused by other *Candida* species, such as *C. tropicalis, C. parapsilosis, C. albicans, C. glabrata*; and other antimicrobial biofilms, caused by gram-positive/gram-negative bacteria as well, albeit with a few variations, as may be obvious to a person skilled in the art.

The composition of the present disclosure reduces an amount of *Candida auris* biofilm by at least 50%, preferably 60%, more preferably 70%, more preferably 80%, more preferably 90%, and yet more preferably 99%, 24 hours after contacting the composition with the surface. The reduction is defined as the total number of colonies on the surface after contacting compared to prior to the contacting with the composition.

In some embodiments, the *Candida auris* is any *Candida auris* strain. *Candida auris* strains may have mutations which improve their multidrug resistance. For example, the strain of the present disclosure may have at least one DNA mutation, preferably 1-10, 2-9, 3-8, 4-7, or 5-6 mutations. In some embodiments, the mutation is a substitution, deletion, insertion, translocation, or combination thereof. In some embodiments, the mutation is a silent mutation or a missense mutation. In some embodiments, the at least one mutation is in the ERG11 gene, TAC1B gene, and/or FUR1 gene of the *Candida auris* strain. In a preferred embodiment, even if the *Candida auris* strain has at least one mutation, the composition of the present disclosure reduces an amount of corresponding *Candida auris* biofilm by at least 50%, preferably 60%, more preferably 70%, more preferably 80%, more preferably 90%, and yet more preferably 99%, 24 hours after contacting the composition with the surface.

The composition includes silicalite and silver nanoparticles. Silicalite is a polymorphic form of silica, silicon dioxide or $SiO_2$. It is one of several polymorphs of silicon dioxide, having tetrahedral silicon centers and two-coordinate oxides. In a preferred embodiment, the silicalite is silicalite-1. Silicalite-1 is a zeolite with no aluminum content. Silicalite-1 can be hydrothermally synthesized from most silica sources in the presence of a template to form a porous structure having both micropores and mesopores as will be described later. In an embodiment, the silicalite-1 has a mordenite framework inverted (MFI) structure, similar to that of Zeolite Socony Mobil-5 (ZSM-5) but without aluminum. The MFI framework has several pentasil units linked together by oxygen bridges to form pentasil chains. A pentasil unit includes eight five-membered rings. In these rings, the vertices are Si and an O is bonded between the vertices. The pentasil chains are interconnected by oxygen bridges to form corrugated sheets with 10-ring holes. Like the pentasil units, each 10-ring hole has Si as vertices with an O bonded between each vertex. Each corrugated sheet is connected by oxygen bridges to form a structure with straight 10-ring channels running parallel to the corrugations and sinusoidal 10-ring channels perpendicular to the sheets.

Although the description, and the examples herein provided, include silicalite-1 in the composition, the method of the present disclosure may be adapted to include aluminosilicate zeolites including Zeolite Socony Mobil-5 (ZSM-5), ZSM-11, albeit with a few variations, as may be obvious to a person skilled in the art. The aluminosilicate zeolites may be optionally modified with metals such as titanium—for example TiZSM-5.

The composition further includes silver nanoparticles (AgNPs). In some embodiments, the AgNPs have a hexagonal, cubic, or tetragonal crystal system. In a preferred embodiment, the AgNPs have a cubic crystal system. In a preferred embodiment, the AgNPs are crystalline. In general, the nanoparticles can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In some embodiments, the silver nanoparticles are substantially spherical. In some embodiments, the silver nanoparticles have an average diameter of 1-20 nm, preferably 5-15 nm, or about 10 nm.

The composition of the present disclosure may be synthesized by hydrothermal crystallization from a reaction mixture including silica and silver, and preferably one or more organic templates. Referring to FIG. 1, a schematic flow diagram of the method 100 of making a composition is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, the method 100 includes adding silica in an alkaline solution to form a first solution. The silica may be crystalline or amorphous in nature. Suitable examples of crystalline silica are cristobalite, quartz, and tridymite. Amorphous silica may be obtained from natural sources. Suitable examples of silica obtained from natural sources include Kieselguhr. In some embodiments, amorphous silica is commercially procured (also referred to as synthetic silica). Synthetic silica may be in the form of silica gel or colloidal silica. In a preferred embodiment, silica is colloidal silica. The colloidal silica is an alkaline solution, with 40 wt. % solids aqueous dispersion of colloidal silica. The colloidal silica has a particle size in a range of 10-30 nm, preferably 20 nm. The colloidal silica used in the present disclosure is marketed under the brand name Ludox™ AS40.

In some embodiments, a source of alumina may be optionally added. The source of alumina is advantageously selected from among the salts of aluminum and the various forms of hydrated or dehydrated alumina. Suitable examples include sodium aluminate, aluminum chloride, aluminum sulfate, aluminum nitrate, colloidal alumina, boehmite, pseudo-boehmite, hydrargillite, amorphous alumina, transition alumina, and mixtures thereof. In a preferred embodiment, the aluminum source is aluminum nitrate. In some embodiments, the silica source can be fluosilicates in the form of inorganic salts, or as an acid. In some embodiments, a portion of the silica and of the alumina can be introduced in the form of an aluminosilicate. Typically, the aluminosilicate is employed in an amorphous state. In some embodiments, a titanium source may be optionally added. Suitable examples of titanium sources include titanium alkoxides, water-soluble titanates, titanium chelates, or mixtures thereof. In a preferred embodiment, the titanium source is titanium isopropoxide.

The colloidal silica, along with other optional ingredients (aluminum source and/or titanium source) is dissolved/mixed in an alkali solution to form a first solution. The silica can also be introduced in the form of a finely divided powder, or in the form of precipitated silica. The concentration of silica in the first solution is in a range of 10-50 wt. %, preferably 20-45 wt. %, and more preferably about 40 wt. %.

The alkaline solution is a solution of a base with a pH in a range of 8-13. Suitable examples of bases in the alkaline solution are sodium hydroxide, potassium hydroxide, ammonia, lithium hydroxide, sodium carbonate, calcium carbonate, or other inorganic bases, as may be obvious to a person skilled in the art. In a preferred embodiment, the base is NaOH. The step 102 is carried out at a temperature range of 20-100° C. for a period of 10-60 minutes, preferably 15-30 minutes, more preferably 15 minutes, under stirring, to form the first solution. In some embodiments, the first solution may be aged for 1-3 days to allow for the dissolution of silica through the hydrolysis of Si—O—Si bonds.

At step 104, the method 100 includes adding a silver salt into the first solution to form a second solution. Suitable examples of silver salts include silver acetate, silver carbonate, silver chloride, silver iodide, silver nitrate, silver (I) oxide, silver phosphate, silver sulfate, silver sulfide, silver tetrafluoroborate, and silver trifluoromethanesulfonate. In a preferred embodiment, the silver salt is silver nitrate. The concentration of the silver salt in the first solution depends on the desired Si/Ag atomic ratio of the composition. In an embodiment, the desired Si/Ag atomic ratio is in a range of 200:1 to 1:1, preferably 150:1, 100:1, 75:1, 50:1, 25:1, 15:1, 10:1, 5:1 or 1:1. The step 104 is carried out for a period of 10-60 minutes, preferably 15-30 minutes, more preferably 15 minutes, under stirring, to form the second solution.

At step 106, the method 100 includes adding a template into the second solution to form a third solution. Suitable examples of the template include tetramethylammonium; tetraethylammonium; tetrapropylammonium; tetrabutylammonium ions; di-n-propylamine; tripropylamine; triethylamine; triethanolamine; piperidine; cyclohexylamine; 2-methylpyridine; N,N-dimethylbenzylamine; N,N-diethylethanolamine; dicyclohexylamine; N,N-dimethylethanolamine; 1,4-diazabicyclo(2,2,2) octane; N-methyldiethanolamine, N-methyl-ethanolamine; N-methylcyclohexylamine; 3-methyl-pyridine; 4-methylpyridine; quinuclidine; N,N'-dimethyl-1,4-diazabicyclo(2,2,2) octane ion; di-n-butylamine, neopentylamine; di-n-pentylamine; isopropylamine; t-butylamine; ethylenediamine; pyrrolidine; and 2-imidazolidone, morpholine, or mixtures thereof. The choice of the template plays a role in determining the crystalline size, morphology, pore size, and pore volume, of the composition-all of which influence the performance of the composition in reducing *C. auris* biofilms. In a preferred embodiment, the template is tetrapropyl ammonium hydroxide (TPAOH). In some embodiments, seed crystals of silicalite or ZSM-5 may be used alone/in combination with the template to facilitate crystallization.

At step 108, the method 100 includes hydrothermally treating the third solution for 10-100 hours to form a precipitate. The hydrothermal treatment results in the formation of silver nanoparticles that are encapsulated in a matrix of silicalite. The hydrothermal treatment may be performed in a sealed Teflon-lined, stainless-steel autoclave (at temperatures typically below 250° C., preferably between 50-250° C.). Initially, zeolite nuclei can be detected, which over a period of time would transform into zeolite crystals (silicalite). The reaction time for hydrothermal treatment may take place for a few hours, such as 1-3 hours, preferably 1.5-2 hours; or may be carried out for several days—to yield a precipitate. Variations in temperature, synthesis time, alkalinity, ratios between reactants, sources of reactants, water content, stirring, and many other factors could lead to distinct differences in the zeolite formed, crystal size/morphology, chemical compositions, etc. Variations in these conditions are possible, and such variations may be obvious to a person skilled in the art.

At step 110, the method 100 includes filtering, drying, and calcining the precipitate to obtain the composition. The precipitate is separated from the third solution by filtration using a filter paper or a crucible. The precipitate is dried to a temperature of 50-100° C. and then calcined to obtain the composition. The calcination process may involve one or more steps. In an embodiment, the calcination was carried out by heating the composition to a temperature range of 200-700° C., preferably 300-600° C., or 400-500° C. at a heating rate of 1-20° C./min, preferably 3-15° C./min, preferably 5-10° C./min, more preferably at about 5° C./min in an inert nitrogen/argon/synthetic air/atmosphere. This process was carried out for about 1-5 hours, preferably 1-3 hours. The calcination may be performed by any conventional method or apparatus known to a person skilled in the art, for example, but not limited to, using a muffle furnace, electric furnace, tube furnace, box furnace, crucible furnace, microwave furnace, vacuum furnace, rotary kiln, or fluidized bed furnace. The calcination process aims to remove the structural template from the pores of the composition. In some embodiments, any other methods can be performed to remove the structural template from the pores of the composition instead of calcination. In some embodiments, the template remains in the composition following calcination. In some embodiments, the composition comprises less than 20 wt. % of the template, preferably 15 wt. %, 10 wt. %, 5 wt. %, or 1 wt. %, based on the total weight of the composition.

In some embodiments, the method forms silver nanoparticles that are surrounded by and fit within the resulting silicalite matrix. In some embodiments, the Ag nanoparticles are decorated on the outside surface of the silicalite matrix. In some embodiments, Ag is present on both the inside and outside of the silicalite matrix. In some embodiments, a portion of the silver nanoparticles, preferably 10%, 20%, 30%, 40%, 50%, 60%, 70%, 80%, 90%, or 100%; are isomorphously substituted in a matrix of the silicalite. Isomorphous substitution is defined as a process of replacing one structural cation for another of similar size. Therefore, Ag replaces Si in the silicalite matrix crystal structure. In some embodiments, the amount of Si replaced by the Ag is dependent on the ratio of Si/Ag as previously described.

The particles of the composition can be any shape known to one of ordinary skill in the art. Examples of suitable shapes the nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplates, nanodisks, rods (also known as nanorods), and mixtures thereof. In some embodiments, the nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of nanoparticles having a different shape. As used herein, the term "non-uniform shape" refers to an average consistent shape that differs by more than 10% of the distribution of nanoparticles having a different shape. In some embodiments, the particles of the composition are substantially spherical. In some embodiments, the particles of the composition have an average diameter of 400-800 nm, preferably 450-750 nm, 500-700 nm, or 550-650 nm.

In some embodiments, the composition has both mesopores (pores with a size of 2-50 nm) and micropores (pores smaller than 2 nm). The composition has a total surface area of 300-400 m$^2$/g, preferably in a range of 320-380 m$^2$/g, or 340-360 m$^2$/g. In an embodiment, a portion of the total surface area includes the mesopores and a portion includes the micropores. In an embodiment, the micropore surface area is 150-250 m$^2$/g, preferably 175-225 m$^2$/g, or about 200 m$^2$/g. In an embodiment, the mesopore surface area is 100-200 m$^2$/g, preferably 125-175 m$^2$/g, or about 150 m$^2$/g.

In some embodiments, the composition has a total pore volume of 0.05 to 0.5 cm$^3$/g, preferably 0.1 to 0.4 cm$^3$/g, or 0.2 to 0.3 cm$^3$/g. In an embodiment, a portion of the total pore volume includes the mesopores and a portion includes the micropores. In some embodiments, the composition has a micropore volume of 0.05 to 0.2 cm$^3$/g, preferably 0.1 to 0.15 cm$^3$/g, or about 0.12 cm$^3$/g. In some embodiments, the composition has a mesopore volume of 0.05 to 0.3 cm$^3$/g, preferably 0.1 to 0.2 cm$^3$/g, or about 0.15 cm$^3$/g. In some embodiments, the mesopores and the micropores have a pore volume ratio of 1.5:1 to 1:1, preferably 1.4:1, 1.3:1, 1.2:1, or 1.1:1. In some embodiments, the composition has an average pore size distribution (PSD) of 1-5 nm, preferably 2-4 nm, or about 3 nm.

In some embodiments, the composition is at least 50% crystalline, preferably 60%, 70%, 80%, 90%, or 100% crystalline. In some embodiments, the composition includes 2-7 wt. %, preferably 3-6 wt. %, or 4-5 wt. % Ag, 40-60 wt. %, preferably 45-55 wt. %, or about 50 wt. % O, 1-3 wt. %, preferably 1.5-2.5 wt. %, or about 2 wt. % Na, 5-15 wt. % preferably 7-12, wt. %, or about 10 wt. % C, and 25-40 wt. %, preferably 30-35 wt. %, or about 33 wt. % Si. In some embodiments, the composition consists of carbon, oxygen, silicon, sodium, and silver.

In some embodiments, the particles of the composition are not agglomerated and are individual particles. In some embodiments, the AgNPs are not agglomerated in the composition. In some embodiments, the silver nanoparticles are homogeneously dispersed throughout the silicalite matrix.

In some embodiments, following the contacting of the composition with the surface, the composition attaches to a cell surface and at least partially penetrates a *Candida auris* cell in the biofilm on the surface, thereby causing the disruption of the cell wall and cell membrane. The gradual disruption causes the cell to lose cellular integrity and therefore causes cell death. In some embodiments, the attachment and/or penetration into the *Candida auris* cell causes a change in the morphology of the cell. In some embodiments, the change in morphology is from monodisperse smooth surface ovoid shaped cells to spherical shaped cells of different sizes. In some embodiments, the ovoids have an average length and an average width of 1-3 μm, preferably 1.5-2.5 μm or about 2 μm. In some embodiments, the spherical shaped cells following attachment and/or penetration with the composition has an average size of 300-800 nm, preferably 400-700 nm, or 500-600 nm.

While not wishing to be bound to a single theory, it is thought that the combination of the metal ion and the carrier impact their bioaction. In general, the mode of action of the nanomaterial is linked to its particle size and morphology that attaches to specific molecular targets, leading to the disruption of the cell metabolism and cell structure, therefore affecting vitality and growth. Ag-doped nanomaterials may cause simultaneous actions of structural and metabolic disruption in the *Candida* cells, for example, depolarization of the membrane, disruption of cell membrane/wall, elevation in reactive oxygen species (ROS) production, inhibition of enzymatic action, and cell arrest. It is thought that the maintained crystallinity and size of the silver nanoparticles plays a factor in the ability to perform simultaneous actions. This collective disruption of cellular organization and function minimizes the cells ability to resist the nanomaterial action. Moreover, the high surface-to-volume ratios of the nanomaterials allow for more interactions between the composition and the cells. It is thought that Van der Waals forces, receptor-ligand, hydrophobic interactions, and electrostatic attractions play a role in nanomaterial-bacteria interfaces for robust antibacterial action. Therefore, the synergistic combination of the high surface area silicalite and silver nanoparticle interactions allow for an effective composition in reducing an amount of a *Candida auris* biofilm.

EXAMPLES

The following examples demonstrate a method of reducing the amount of *Candida auris* biofilm with the composition as described herein. The examples are provided solely for illustration and are not to be construed as limitations of the present disclosure, as many variations thereof are possible without departing from the spirit and scope of the present disclosure.

Example 1: Collection and Cultivation of C. auris Strains

Nineteen strains of C. auris were collected from microbiology labs from the clinical samples of King Fahd Hospital of the University, Khobar, Saudi Arabia, and King Fahad Specialist Hospital, Dammam, Saudi Arabia. The clinical isolates were identified by matrix-assisted laser desorption ionization-time-of-flight mass spectrometry (MALDITOF MS) analysis at the time of collection. Strains were restored from −80° C. freezer storage and sub-cultured on Sabouraud dextrose broth (SDB) to confirm viability. The broth was incubated at 37° C. for 48 h, and single colonies were isolated using the streak plate method on SDA to confirm the purity. The inoculated agar plates were incubated at 37° C. for 48 h. The slides were examined under a light microscope to describe the morphology of cells.

Example 2: Molecular Identification: DNA Extraction

Genomic deoxyribonucleic acid (DNA) was extracted from 19 strains of C. auris using Qiagen's yeast/Bact kit (Gentra Puregene Yeast/Bact. Kit, Qiagen's, Hilden, Germany). The DNA concentration was measured to estimate the DNA quantity and purity using nanodrop.

Example 3: Amplification of 18S Ribosomal Ribonucleic Acid (rRNA) Gene

A total of 19 strains were amplified by using 18S rRNA gene (F: 5' GTCTGCAAGTCGTAACAAGGTTT-CACTGTAG-3' (SEQ ID NO: 1); R: 5'-AAGGAAAGGTCCAGCCGGAC CAG-3') (SEQ ID NO: 2) primers (MoleQule-On, Auckland, New Zealand) at annealing of 61.8° C. in a thermocycler (T-professional, Biometra, Gottingen, Germany). Polymerase Chain Reaction (PCR) amplicons were gel loaded and documented upon electrophoresis. The PCR amplified products were purified using a QIAquick purification kit (Qiagen, Germany) to remove the components other than the amplicon. Cycle-sequenced products were sequenced by using 3500 capillary sequencings. Then the amplicons sequenced were aligned in nBLAST.

Example 4: Amplified of ITSa and ITSb Regions 19 strains were PCR amplified and sequenced for the internal transcribed spacer (ITS) regions: ITSaF: 5'-AT-TTTGCATACACACTGATTTG-3' (SEQ ID NO: 3); ITSaR: 5'-CGTGCAAGCTGTAATTTTGTGA-3' (SEQ ID NO: 4); and ITSbF: 5'-AGGAAT-TCCTAGTAAGCGCAAGT-3' (SEQ ID NO: 5); ITSbR: 5'-ATTTACCACCCACTTAGAGCT-3' (SEQ ID NO: 6) primers. Primers were synthesized at MoleQule-On (Auckland, New Zealand). The amplification of ITSa and ITSb regions were carried out at annealing temperature of 55° C. and 57.5° C., respectively, in T-professional thermocycler (Biometra, Gottingen, Germany) PCR amplicons, gel loaded and documented upon electrophoresis. As described earlier, the PCR amplicons were purified to remove the components other than the amplicon. Next, cycle-sequenced products were sequenced by using 3500 capillary sequencings. Then the amplicons were sequenced and aligned in nBLAST. Finally, all the ITS sequences were analyzed using MEGA11 with the reference sequences obtained from NCBI.

Example 5: Molecular Analysis Resistance-Associated Mutations

Primers were designed using primer BLAST at the national center for bioinformatic information tool (NCBI). Resistance-associated mutations in genes ERG11 (F primer 5'-ATGGCCTTGAAGGACTGCATCGT-3' (SEQ ID NO: 7); R primer 5'-TTAGTAAACACAAGTCTCTCTTTTCTCCCA-3') (SEQ ID NO: 8), TAC1B (F primer 5'-ACGTGGAGAT-GAGTCACAGAACGG-3' (SEQ ID NO: 9); R primer 5'-CTTCGCTATCATCAGAATAATTGAGGCAGTT-3'); and FUR1 (F primer 5'-TGATCCA CGAGCTTTAGCG-CATCACCTTATC-3' (SEQ ID NO: 10); R primer 5'-AG-ATGTGGGTCACTCTGAAAGAATATGCTGAAAAC-3') (SEQ ID NO: 11) of 19 strains were amplified by using the PCR technique and visualized using an agarose gel. As stated before, the PCR amplicons were purified to remove the components other than the amplicon. Amplicons were sequenced separately by using 3500 capillary sequencing for detecting drug-resistance-associated mutations. A representative of the sequences was submitted to GenBank.

Example 6: Synthesis of Nanomaterial (Ag-Silicalite-1 and 4 wt. % Ag/TiZSM-5)

In the first step, Ludox (40 wt. %) was added dropwise in an alkaline solution and stirred for 15 min. Then, silver nitrate corresponding to a Si/Ag ratio of 25 (0.33 g) dissolved in 2.5 mL water was added and stirred for 15 min. Then tetrapropyl ammonium hydroxide (TPAOH (40%)) was added dropwise and stirred for 1.5 h. Then the solution mixture was hydrothermally treated for 3 days to yield a precipitate. After the treatment, the precipitate was filtered, dried, and calcined to obtain Ag-silicalite-1.

For TiZSM-5, silica source Ludox AS-40 and template TPAOH (40%) were mixed and stirred for one hour. Then, 0.63 mL of TIP (titanium isopropoxide) was added and stirred for 10 min. Then, aluminum nitrate was dissolved in 2.5 mL distilled water and stirred for 15 min. The above mixture was then added to an alkaline solution (2.5 M NaOH) and stirred overnight. Then the solution was aged for 48 h and hydrothermally treated, filtered, dried, and calcined. Then, 4 wt. % Ag was impregnated over TiZSM-5 using the wet impregnation technique. For this purpose, a total of 0.0126 g of silver nitrate salt was taken and dissolved in 60 mL of water; after dissolution, 2 g of TiZSM-5 was added and stirred overnight. Finally, the mixture was dried at 100° C. for 24 hours and then calcined to obtain 4 wt. % Ag/TiZSM-5.

Example 7: Characterization Analysis of the Nanomaterial Techniques

The phase of the Ag-silicalite-1 was analyzed using a benchtop X-ray diffractometer (XRD) (Miniflex 600, Rigaku, 2601A, Tengda Plaza, No. 168, Xizhimenwai Ave, Tokyo, Japan). The textural features, including the BET surface area, pore volume and pore size, were measured using an ASAP-2020 plus (manufactured by Micromeritics Instrument Corporation, Norcross, GA 30093, USA) based on the nitrogen adsorption technique. The silver nanoparticle chemical coordination was analyzed using diffuse reflectance spectroscopy-ultraviolet (DRS-UV)-visible spectroscopy analysis (JASCO, 2967-5, Ishikawa-machi, Hachioji, Tokyo 192-8537, Japan). The decomposition of the template of Ag silicalite-1 was analyzed using thermogravimetric analysis-differential thermal analysis (TGA-DTA) (STA 6000, Perkin Elmer, 940 Winter Street Waltham, MA, USA). Scanning electron microscope (SEM) analysis of Ag-based ZSM-5 and Ag-silicalite-1 was measured using scanning electron microscopy (SEM) equipped with energy dispersive X-ray (EDX) detector (SEM, FEI, Inspect $50 with 20 kV) and transmission electron microscopy (TEM) (TEM, FEI, Morgagni 268 with 80 kV as working voltage). The silver content was determined using an inductively coupled plasma optical emission spectrometer (ICP-OES) Horiba ULTIMA 2 instrument (manufactured by Horbia, 2 Miyanohigashi-cho, Kisshoin, Minami-ku, Kyoto, 601-8510, Japan).

Example 8: Biofilm Analysis Technique

C. auris strains, the clinical isolates, were used to study the effects of the nanomaterial on biofilm formation for 24 and 48 h. All analyses were performed with replicates, and mean values were considered. Initially, culture cells from preserved stock at −80° C. were revived by streaking onto Sabauraud dextrose agar (SDA) plates and incubating overnight at 37° C. From the revived plates, a loopful of the strains was inoculated into SDB and further incubated using an orbital shaker at 130 rpm and 37° C. for 24 and 48 h. The biofilm assay was carried out using the 96-well microtiter plate. The cells harvested from overnight SDB cultures were adjusted to a cell density of 107 CFU/mL and diluted. Biofilms were formed on flat-bottom 96-well microplates on incubation at 37° C. for 24 h. For the 24 h biofilm experiment, the nanomaterials were prepared in a two-fold dilution series in trypticase soy broth (TSB) supplemented with 1% sucrose. Then the dilution series was added to the plates with the C. auris, for the final nanomaterial concentration ranging from 0.5 to 2 mg/mL for drug Ti-ZSM-5, Ag-silicalite-1, 4 wt. % Ag/Ti ZSM-5 and 0.0250 to 0.0025 mg/mL for AgNO$_3$. The untreated culture was considered the growth control. Plates were incubated at 37° C. for 48 h. Post 24 h incubation; the wells were washed two times using phosphate-buffered saline (PBS) to remove non-adherent cells. To obtain the firmly attached biofilms, the 96-well plates with PBS were sonicated for 15 min, and the cells were harvested and serially diluted. The selected dilution was evenly spread on the freshly prepared SDB and further incubated for 24 h. Post incubation, plates were manually counted and recorded for the number of cells. Later, the quantity of biofilm formation was determined using a colony-forming unit technique (CFU) and determined as per the following formula:

A/B×100 (A is the total number of colonies after treatment and B is the number of cells in control).

The assay was carried out for 48 hours using 96-well microtiter plates. The cells harvested from overnight SDB cultures were adjusted to a cell density of 10$^7$ CFU/mL. Biofilms were formed on flat-bottom 96-well microplates by growing C. auris strains in tryptic soy broth (TSB) and incubated at 37 C for 24 h; then the wells were decanted and added with fresh TSB with the nanomaterial suspended with a concentration ranging from 0.5 to 2 mg/mL for drug Ti-ZSM-5, Ag Zeolite, Ag/Ti zeolite and 0.0250 to 0.0025 mg/mL for AgNO$_3$ and further incubated for 24 h. The post incubation period, the wells were washed two times using phosphate-buffered saline (PBS) to remove non-adherent cells. To obtain the firmly attached biofilms, the plates treated with PBS were sonicated for 15 min, and the cells were harvested and serially diluted. Later, the quantity of biofilm formation was determined using the CFU technique. The selected dilution was evenly spread on the freshly prepared SDB, and further incubated for 24 h. Post incubation, plates were manually counted and recorded for the number of cells. Then, the quantity of biofilm formation was determined using the CFU technique and determined as per the following formula:

CFU/mL=(Number of colonies×dilution factor)/volume of plated culture.

One-way ANOVA analysis was subjected to identify the significance between the treatments and clades.

Example 9: Morphogenesis by Scanning Electron Microscopy (SEM) Analysis

The effect of the nanomaterial on the morphogenesis of C. auris was examined using SEM. The strains were grown and treated as described in the previous section. Post incubation of 24 h, the cells were harvested, washed, fixed, dehydrated, and finally coated with gold. The gold-coated cells were analyzed by SEM.

Example 10: Effect on Planktonic C. auris

The antifungal activity of the nanomaterial on planktonic C. auris strains was determined by using light microscopy examination. Briefly, the inoculum was adjusted to a final concentration of 10$^6$ cells mL$^{-1}$. Then, C. auris strains were added in 96-multi-well round-bottom plates having nanomaterials in a two-fold dilution series in TSB, for a final nanomaterial concentration ranging from 0.5 to 2 mg/mL for drug Ti-ZSM-5, Ag Zeolite, Ag/Ti Zeolite, and 0.0250 to 0.0025 mg/mL for AgNO$_3$. Plates were incubated at 37° C. for 48 h. Post incubation, the loopful of treated cells and control was placed on a glass slide and observed using a light microscope (Nikon H550L, Tokyo, Japan). The mean value of the duplicates was recorded, and micrographs were taken. One-way ANOVA analysis was carried out to identify the significance.

Example 11: Molecular Identification of Collected Isolates

Figure 2A:
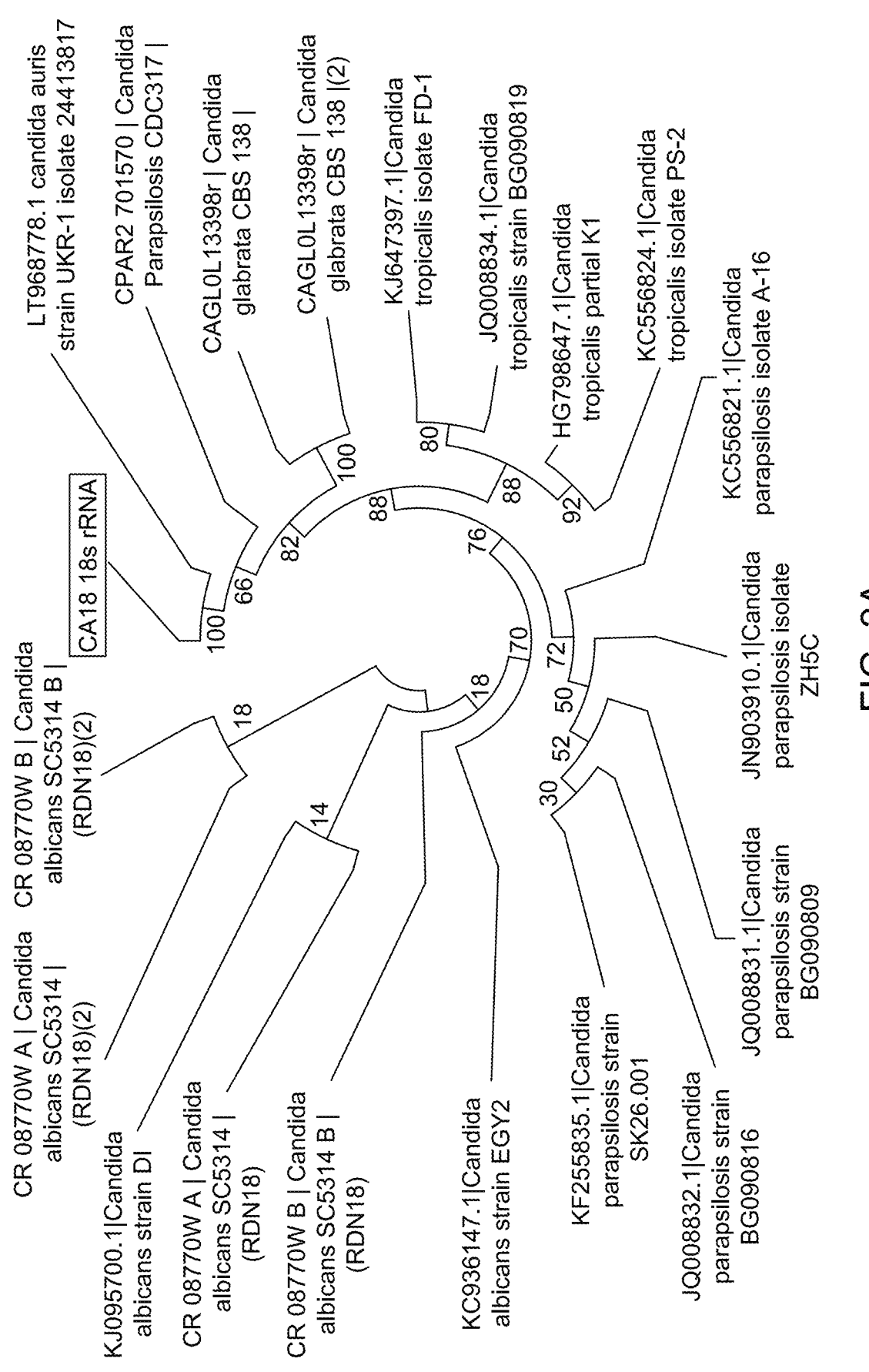
FIG. 2A is a schematic representation of phylogenetic analysis of *Candida auris* isolates, according to certain embodiments.

All the multidrug-resistant isolates of C. auris were re-identified and confirmed using 18S rRNA and ITS regions. All the 18S rRNA gene sequencers were confirmed as having originated from the 18S rRNA gene region of C. auris. A representative of the sequences was submitted to GenBank (GenBank accession ID: OK001860). All the 18S rRNA gene sequences were analyzed using MEGA11 with the standard sequences obtained from fungal databases and NCBI. The representative results of the phylogenic analysis are shown in FIG. 2A. The phylogenic analysis via branching diagram or a tree of 18S rRNA gene sequences with the standard sequences clearly indicates the evolutionary relationships among various Candia species with the study isolate of C. auris based upon similarities in their 18S rRNA gene sequences.

Example 12: Phylogenetics Based on ITS Region

Figure 2B:
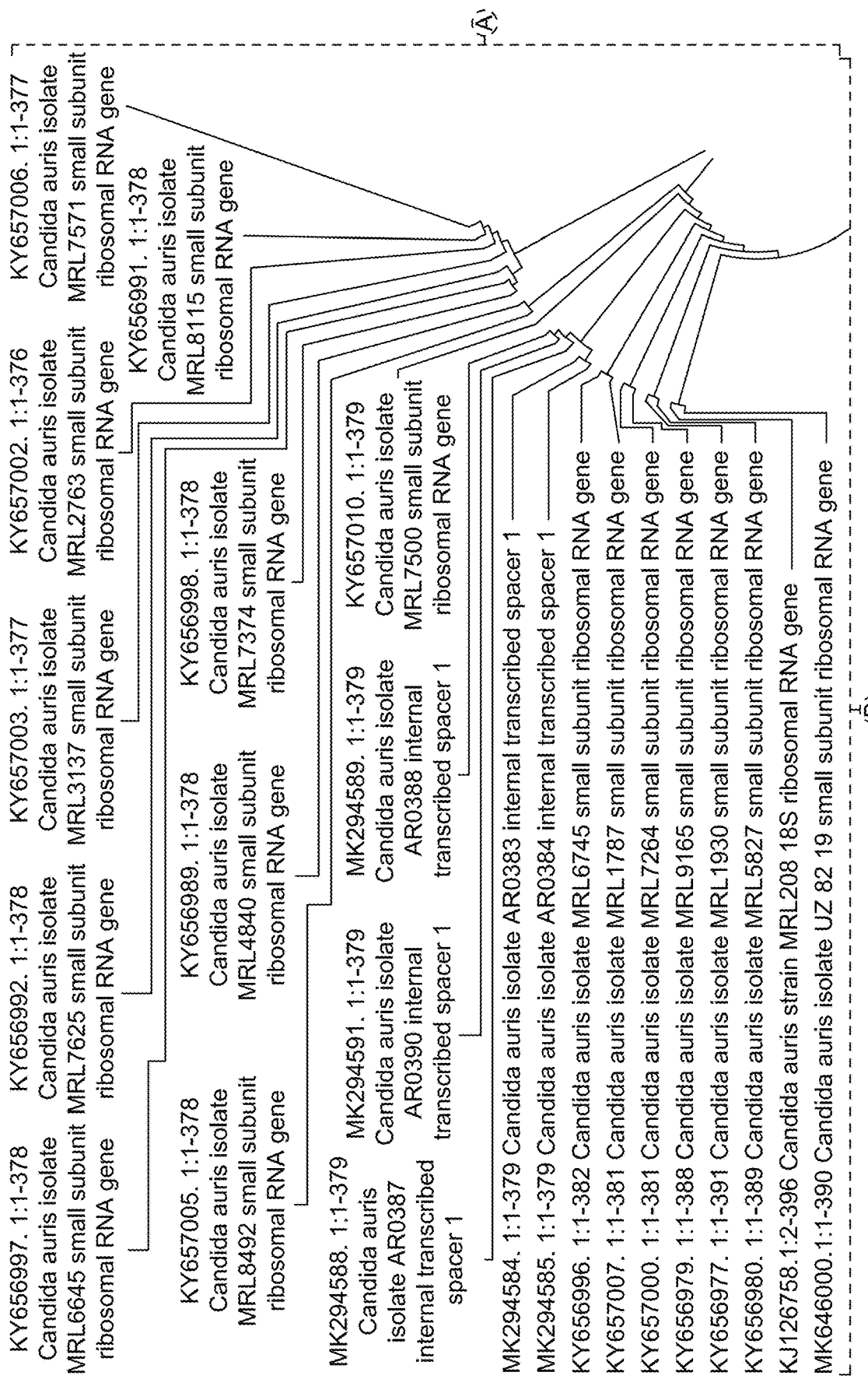
FIG. 2B is a schematic representation depicting an internal transcribed spacer (ITS) sequenced-based phylogenetic analysis of the *Candida auris* isolates, according to certain embodiments.
Figure 2B:
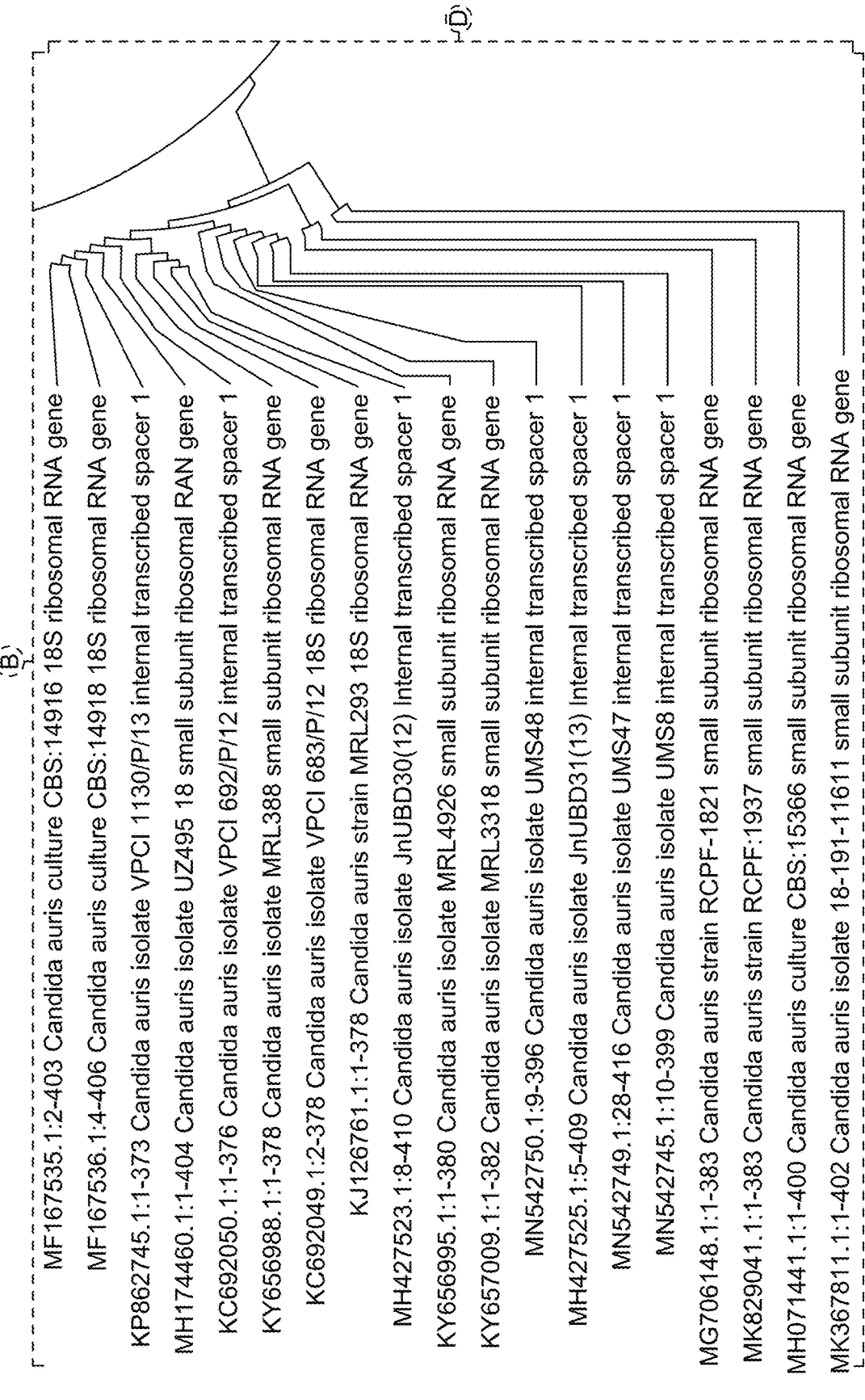
Figure 2B:
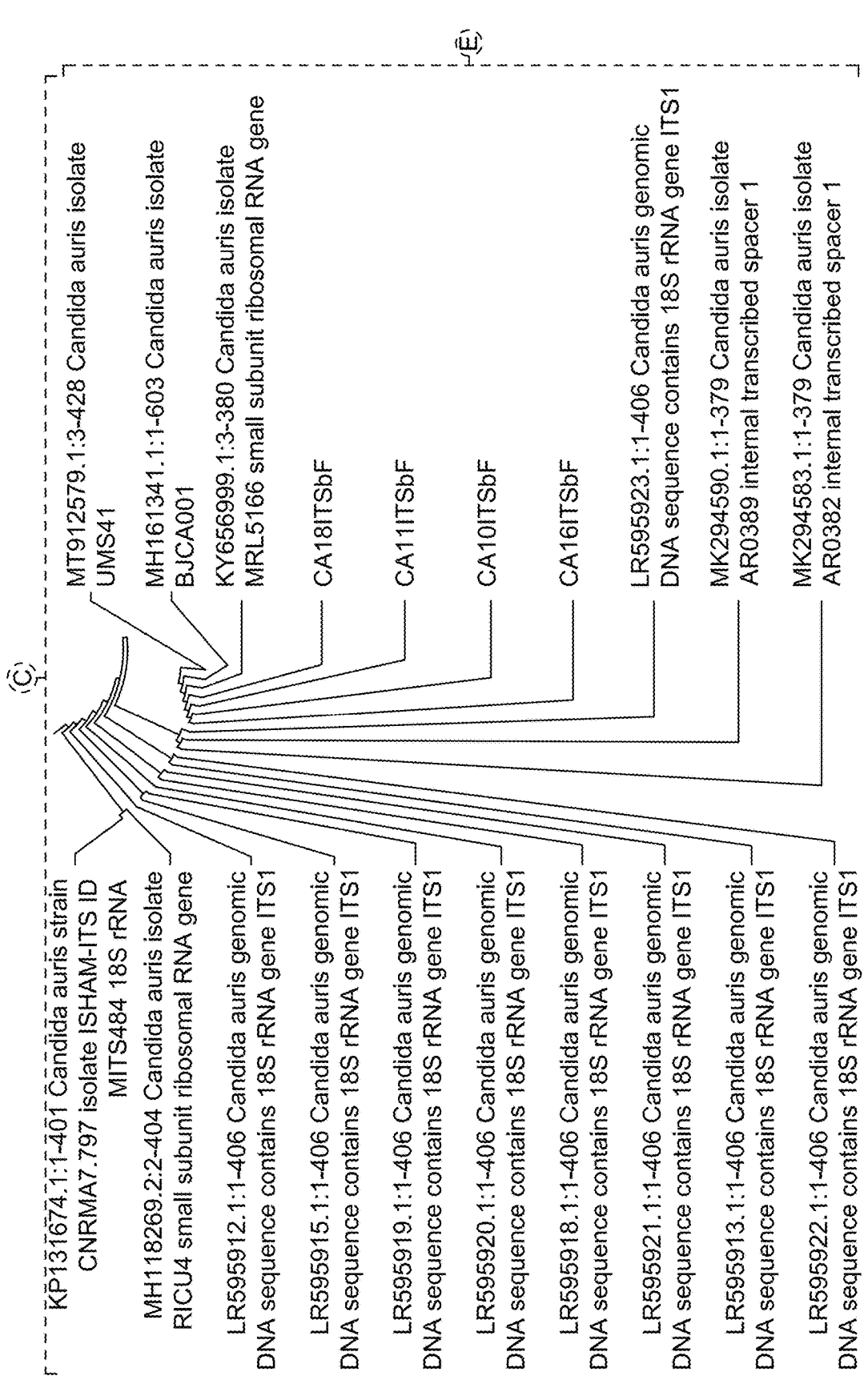
Figure 2B:
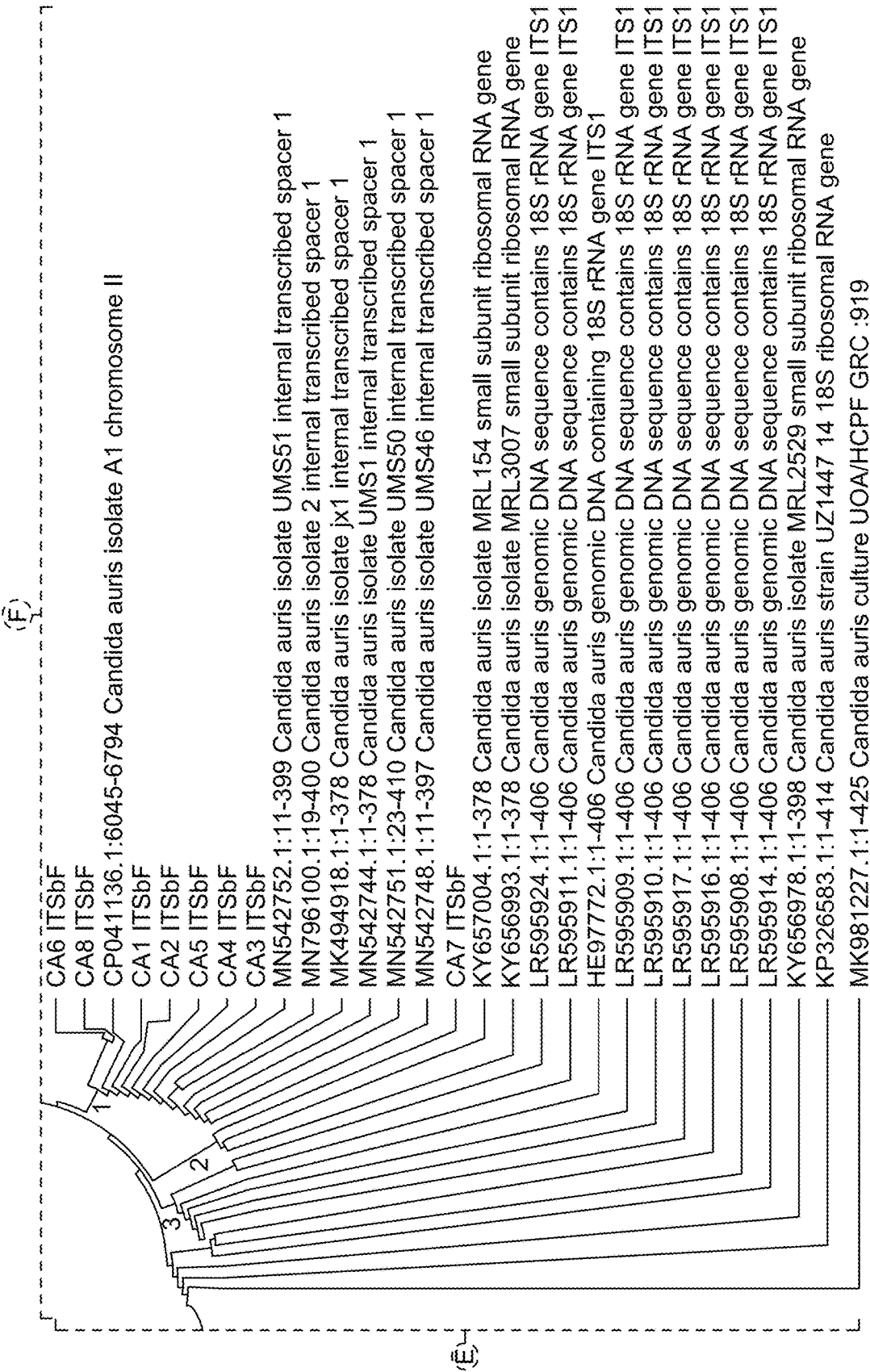
Figure 2B:
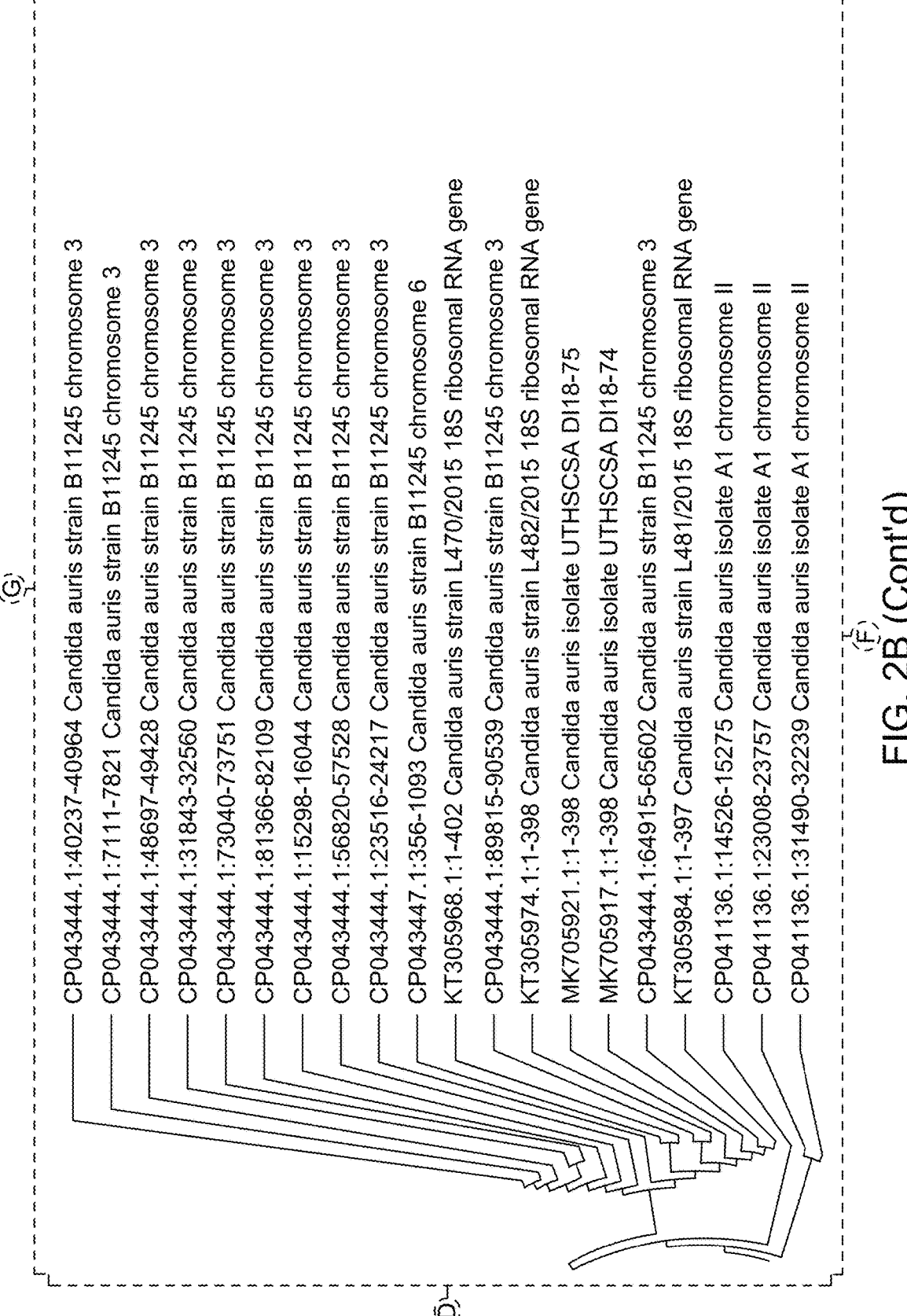
Figure 2B:
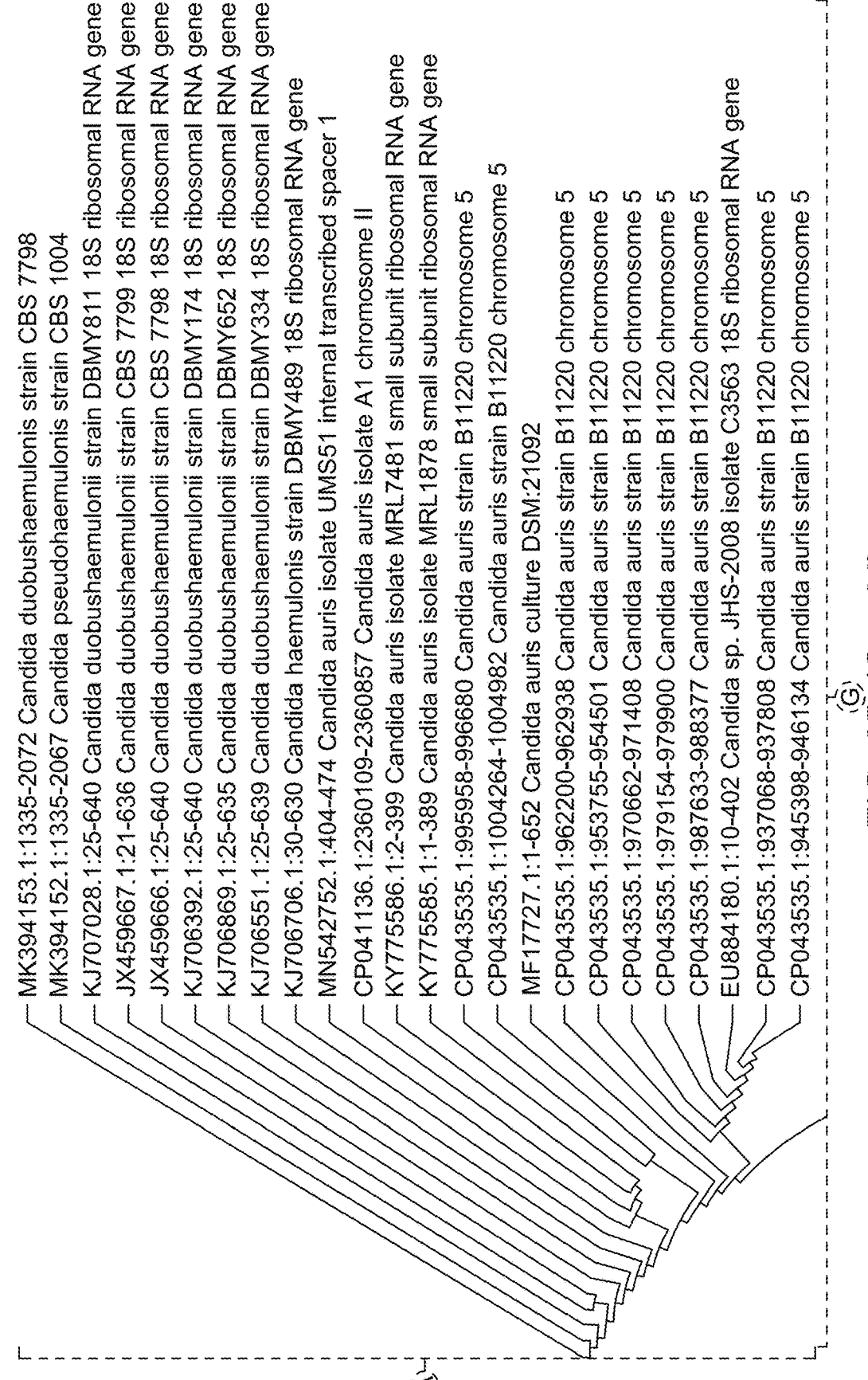

The DNA of the 19 stains of the C. auris was PCR amplified with (290 bp) primers (MoleQule-On, Auckland, New Zealand) and sequenced for the ITS regions (ITSaF: 5'-ATTTTGCATACACACTGATTTG-3' (SEQ ID NO: 3); ITSaR: 5'-CGTGCAAGCTGTAATTTTGTGA-3' (SEQ ID NO: 12); and ITSbF: 5'-AGGAAT-TCCTAGTAAGCGCAAGT-3' (SEQ ID NO: 5); ITSbR: 5' ATTTACCACCCACTTAGAGCT-3') (SEQ ID NO: 6). The sequences were aligned in nBLAST, and it was confirmed that the ITS of the isolates is from *C. auris*. All the ITS sequences were analyzed using MEGA11 with the sequences obtained from NCBI. The results are presented in the form of phylogeny (FIG. 2B)

Example 13: Drug-Resistance-Associated Mutations

Each *Candida auris* isolate collected during the study was PCR amplified for the Lanosterol 14-alpha demethylase (ERG11) gene with (1575 bp) amplicon primers at 59.4° C. and 62.2° C. annealing temperatures for 35 cycles. All ERG11 gene amplicons were documented by using 2% agarose gel. All amplicons were purified and sequenced using forward and revised primers, separately. All sequences from the forward and reversed primers aligned in nBLAST and ensured that all were from ERG11 gene of *C. auris*. Mutation analysis revealed three variations in the sequence of the ERG11 gene using the reference sequence, GenBank Accession: KY410388. F132Y and K143R were the missense variants observed in all the strains successfully amplified. Furthermore, only two strains were observed with a single silent mutation (Table 1).

TABLE 1

List of variants identified in the lanosterol 14-alpha demethylase (ERG11) gene of *Candida auris* isolates.

| Strain No. | F132Y | A143R | K152K |
|---|---|---|---|
| CA1 | +VE | +VE | +VE |
| CA2 | +VE | +VE | – |
| CA3 | +VE | +VE | – |
| CA4 | +VE | +VE | – |
| CA5 | +VE | +VE | – |
| CA6 | +VE | +VE | – |
| CA7 | +VE | +VE | – |
| CA8 | +VE | +VE | – |
| CA9 | +VE | +VE | – |
| CA10 | +VE | +VE | – |
| CA11 | +VE | +VE | – |
| CA12 | +VE | +VE | – |
| CA13 | +VE | +VE | – |
| CA14 | +VE | +VE | +VE |
| CA15 | +VE | +VE | – |
| CA16 | +VE | +VE | – |
| CA17 | +VE | +VE | – |
| CA18 | +VE | +VE | – |
| CA19 | +VE | +VE | – |

Figure 3A:
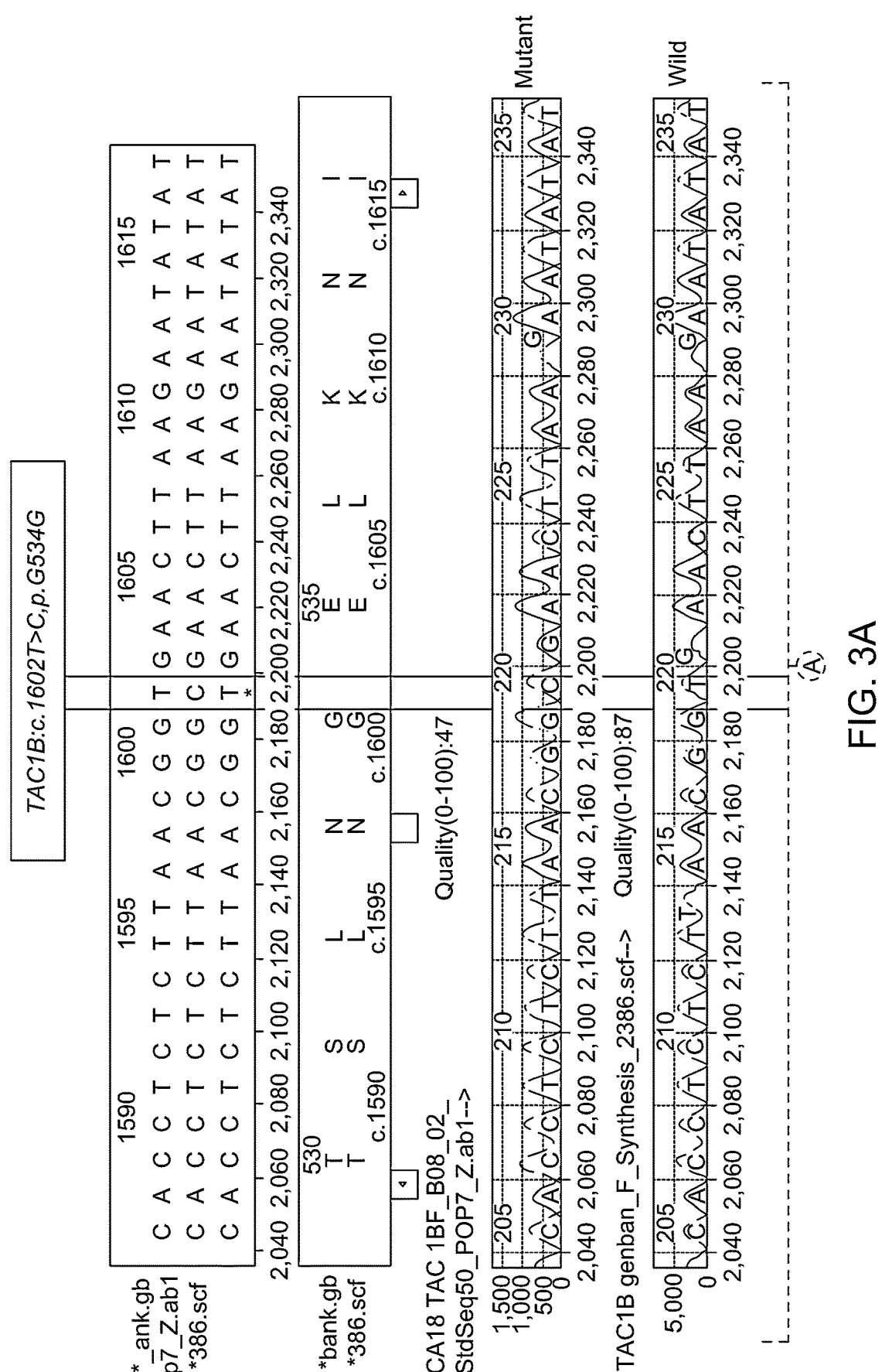
FIG. 3A and FIG. 3B are schematic illustrations depicting a list of silent mutations identified in zinc-cluster transcription factor-encoding gene (TAC1B) of *Candida auris* isolates, according to certain embodiments.
Figure 3A:
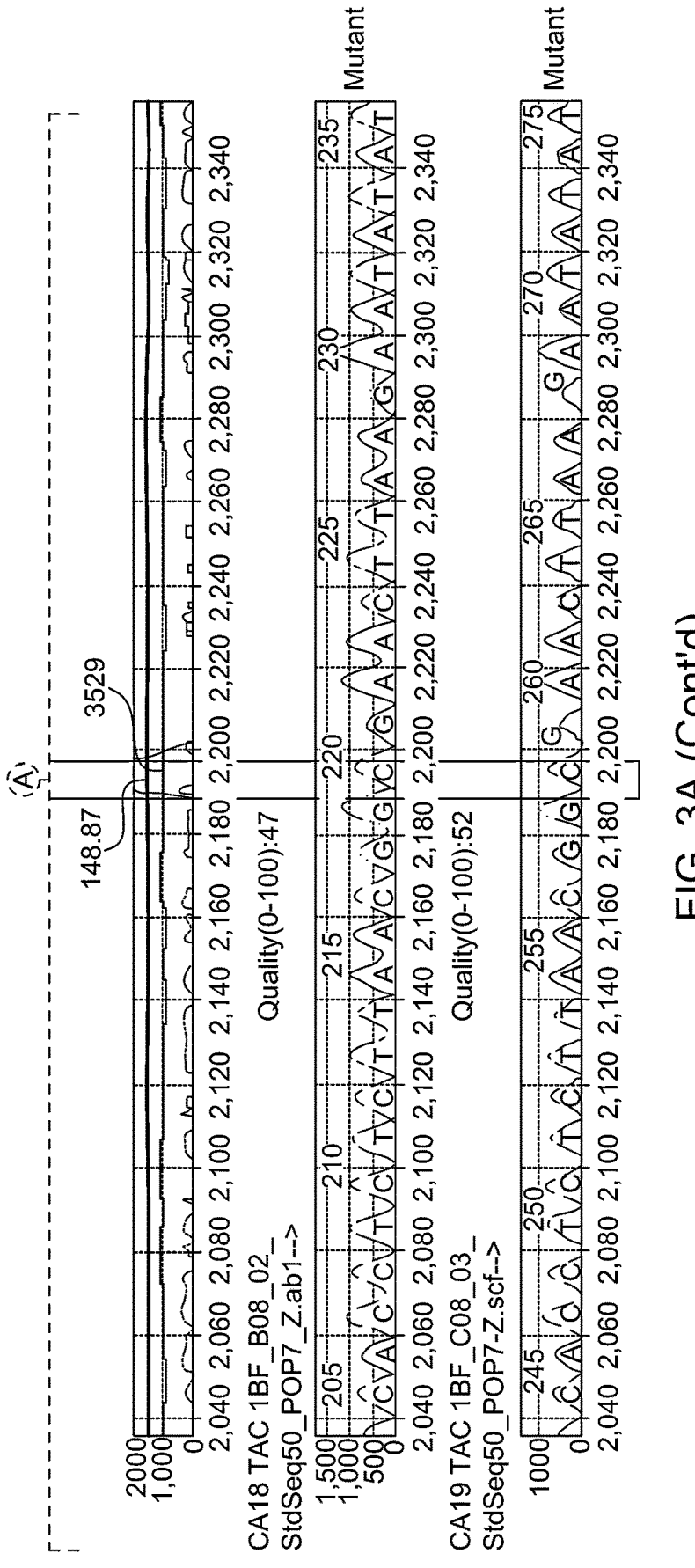
Figure 3B:
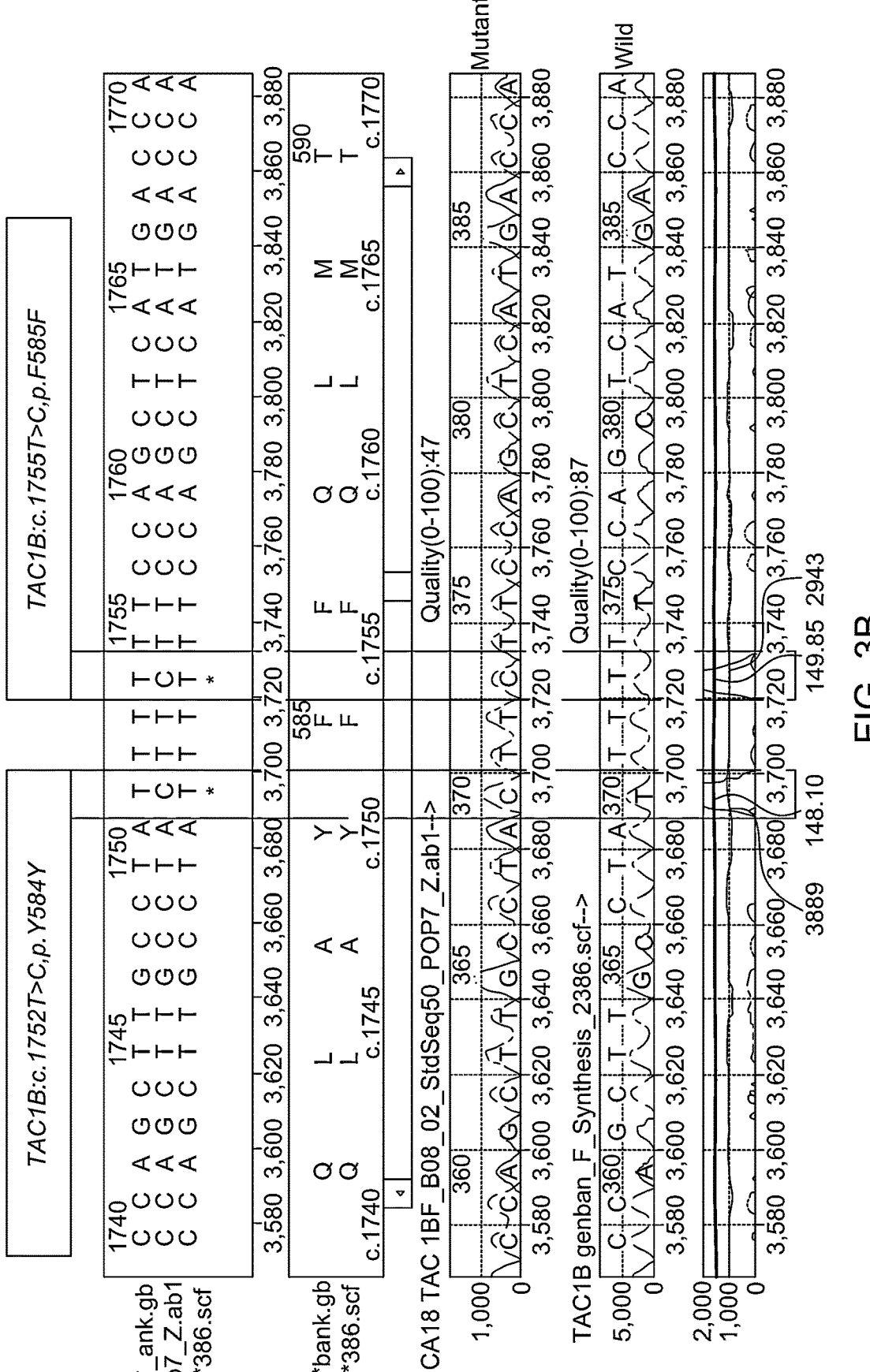
Figure 4A:
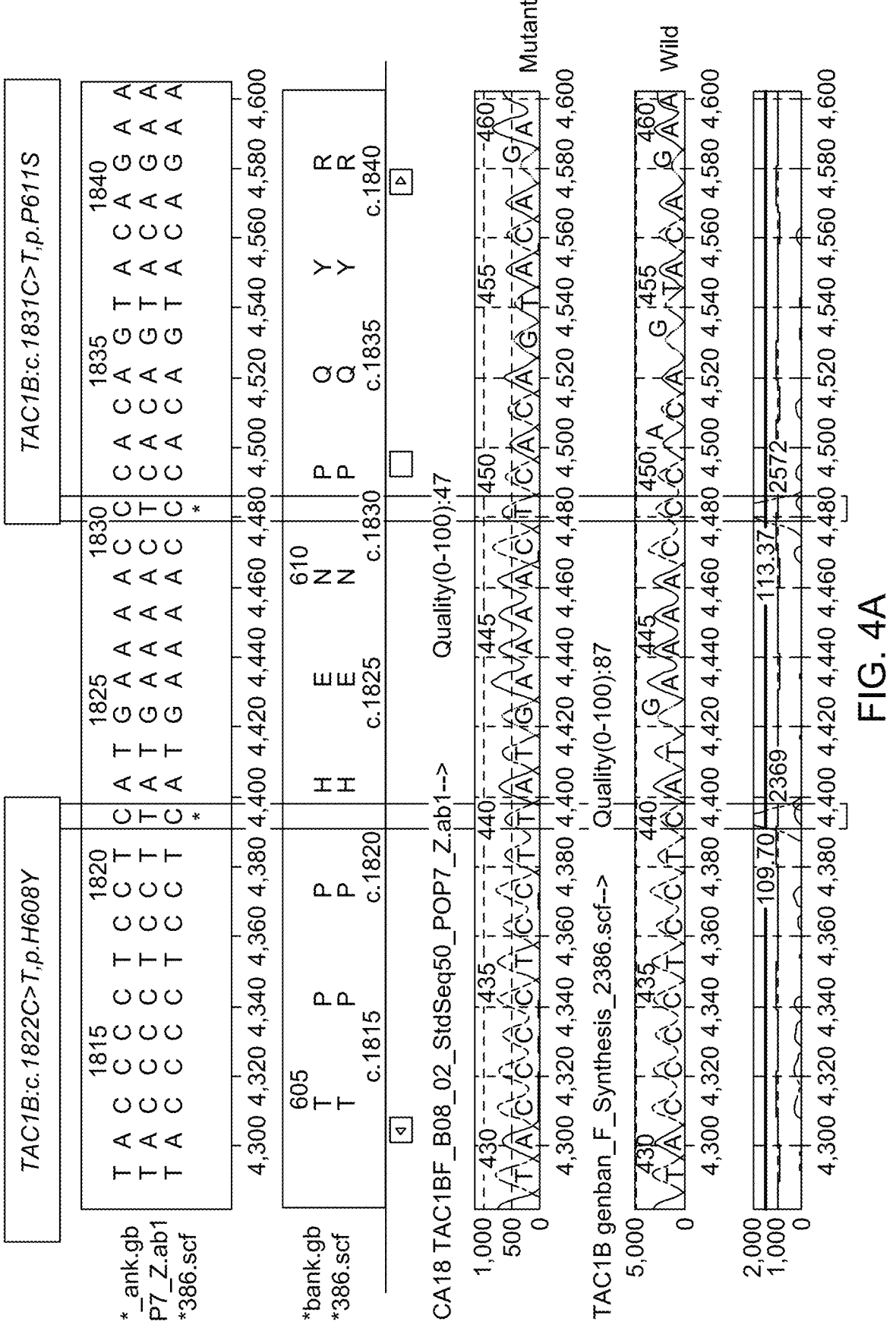
FIG. 4A and FIG. 4B are schematic illustrations depicting a list of missense variants identified in the TAC1B of *Candida auris* isolates, according to certain embodiments.
Figure 4B:
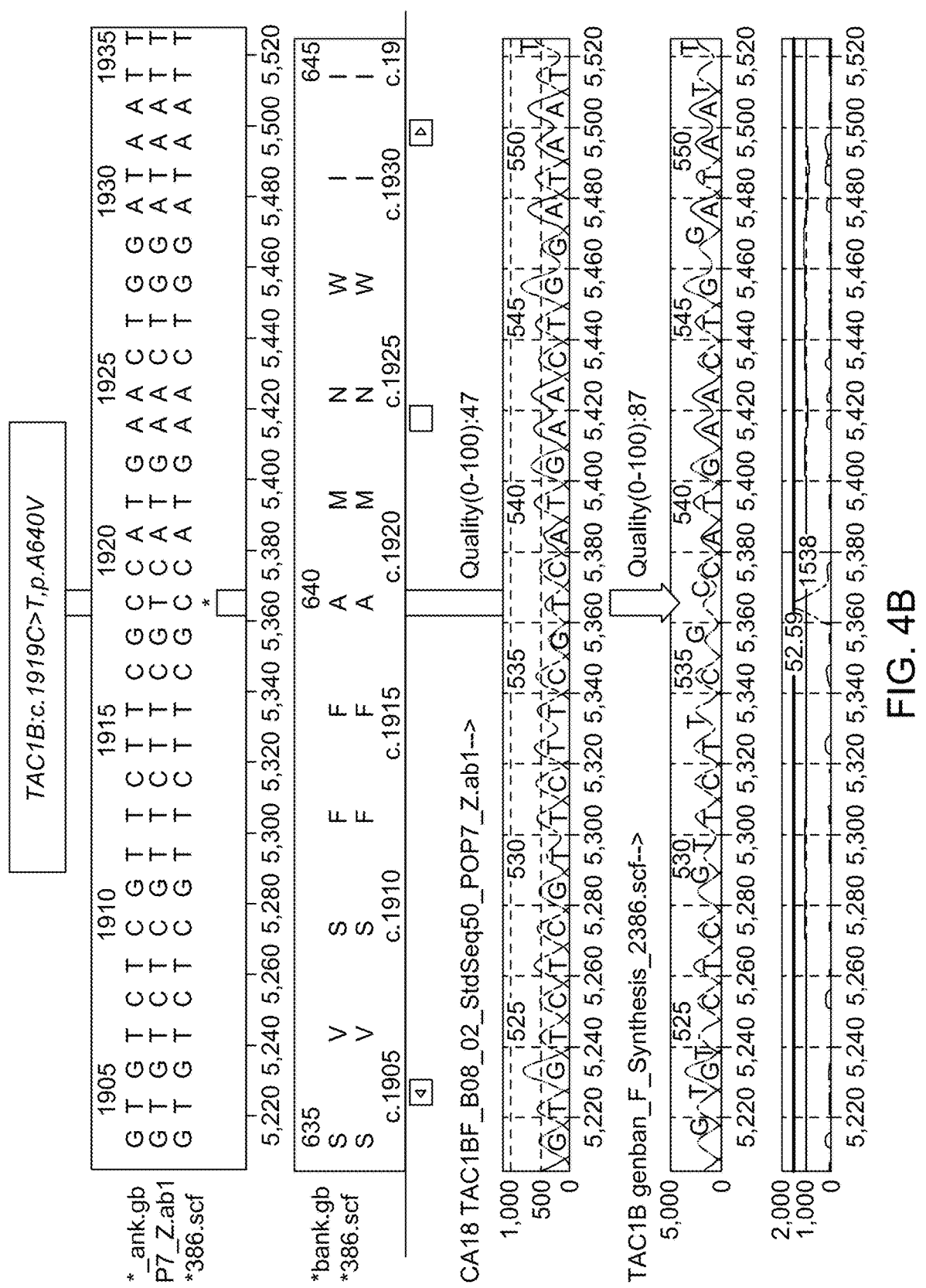

*Candida auris* isolates from the study were subjected to the PCR amplification of the TAC1B gene with (693 bp) primers (MoleQule-On, Auckland, New Zealand). It was ensured that all sequences were from the Zinc-Cluster Transcription Factor-Encoding Gene (TAC1B) gene. Mutation analysis revealed six mutations from the strains, including three (TAC1B:c.1602T>C,p.G534G; TAC1B: c.1752T>C,p.Y584Y; and TAC1B:c.1755T>C,p.F585F) silent mutations (FIGS. 3A and 3B) and three (TAC1B: c.1822C>T,p.H608Y; TAC1B:c. 1831C>T,p.P611S; and TAC1B: c.1919C>T,p.A640V) missense variants (FIGS. 4A and 4B). All three silent mutations observed in all the multidrug-resistant strains were successfully amplified (Table 2).

TABLE 2

List of missense and silent variants identified in TAC1B gene of *Candida auris* isolates.

| Strain No. | Salient variants | | | Missense variants | | |
|---|---|---|---|---|---|---|
| | G534G | Y584Y | F585F | H608Y | P611S | A640V |
| CA1 | +VE | +VE | +VE | +VE | +VE | +VE |
| CA2 | +VE | +VE | +VE | +VE | +VE | +VE |
| CA3 | +VE | +VE | +VE | +VE | +VE | +VE |
| CA4 | +VE | +VE | +VE | +VE | +VE | +VE |
| CA5 | +VE | +VE | +VE | +VE | +VE | +VE |
| CA6 | +VE | +VE | +VE | +VE | +VE | +VE |
| CA7 | +VE | +VE | +VE | +VE | +VE | +VE |
| CA8 | +VE | +VE | +VE | +VE | +VE | +VE |
| CA9 | +VE | +VE | +VE | +VE | +VE | –VE |
| CA10 | +VE | +VE | +VE | +VE | +VE | +VE |
| CA11 | +VE | +VE | +VE | +VE | +VE | +VE |
| CA12 | +VE | +VE | +VE | +VE | +VE | +VE |
| CA13 | +VE | +VE | +VE | +VE | +VE | +VE |
| CA14 | +VE | +VE | +VE | +VE | +VE | +VE |
| CA15 | +VE | +VE | +VE | +VE | +VE | +VE |
| CA16 | +VE | +VE | +VE | +VE | +VE | +VE |
| CA17 | +VE | +VE | +VE | +VE | +VE | +VE |
| CA18 | +VE | +VE | +VE | +VE | +VE | +VE |
| CA19 | +VE | +VE | +VE | +VE | +VE | +VE |

Figure 5:
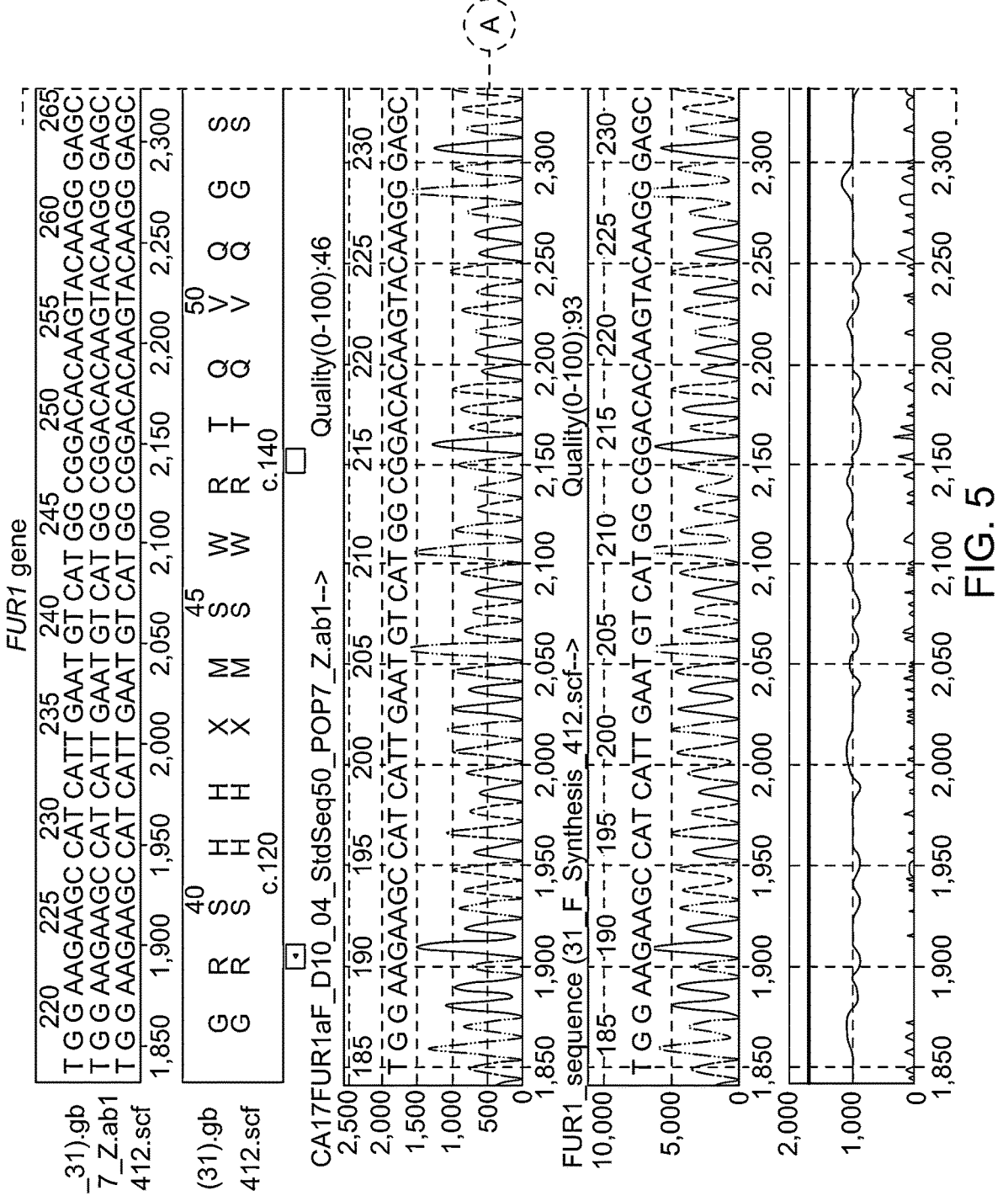
FIG. 5 is a schematic illustration depicting a representative sequence for FUR1 gene of *C. auris* with no variation, according to certain embodiments. The three sequences in the top box are those of SEQ ID NO:22. The two sequences at the bottom of this figure are also given by SEQ ID NO: 22. The amino acid sequences shown in FIG. 5 are given by SEQ ID NO: 28 and 29. The "X" indicates the position of a stop codon in the corresponding DNA sequence. On the second sheet of FIG. 5, all of the DNA sequences are described by SEQ ID NO: 23. The amino acid sequences given on the second sheet of FIG. 5 are given by SEQ ID NO: 30.
Figure 5:
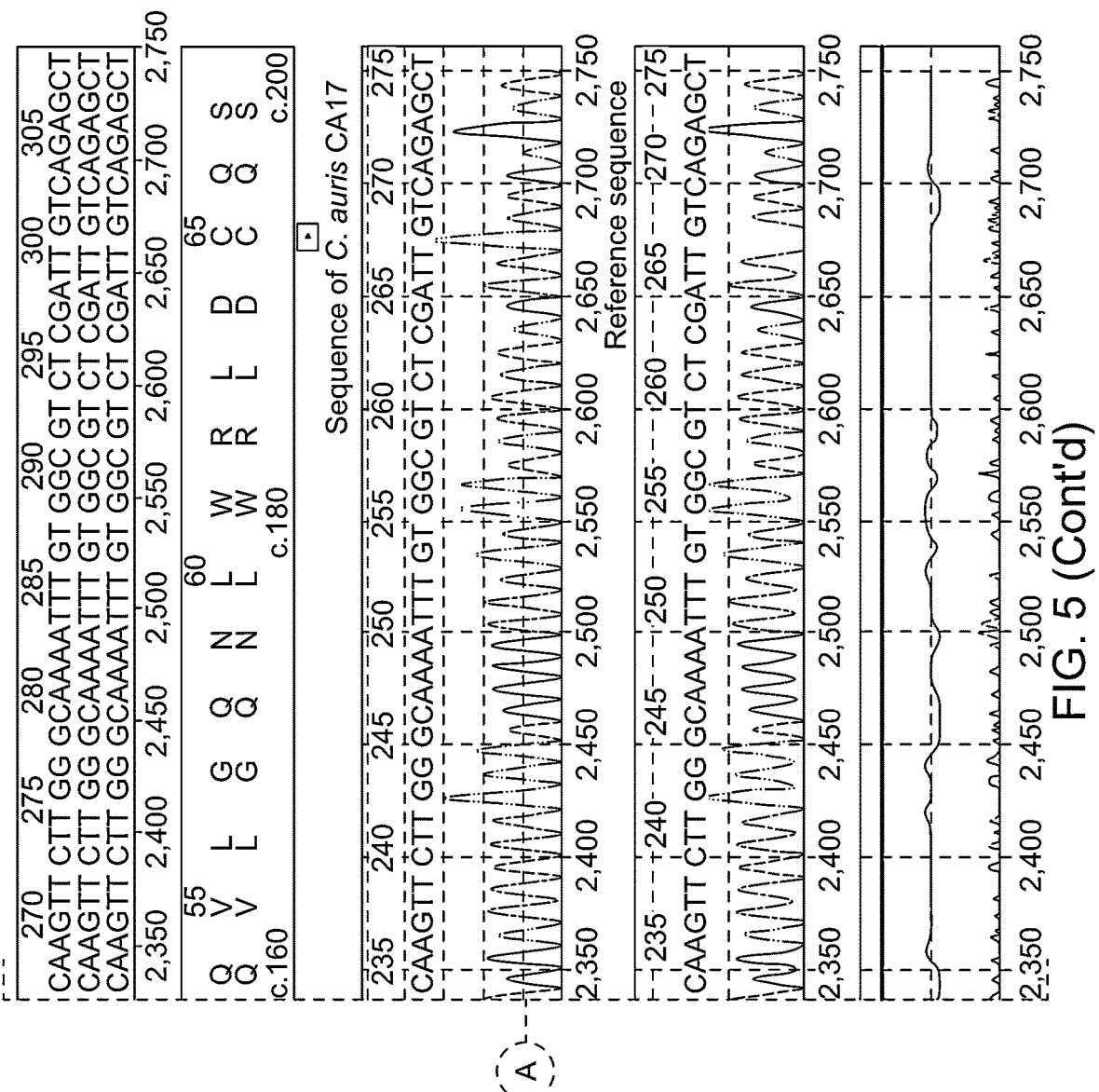

All 19 *C. auris* isolates were PCR amplified with (823 bp) primers (MoleQule-On, Auckland, New Zealand) for Uracil phosphoribosyltransferase (FUR1) gene. F: 5'-TGATC-CACGAGCTTTAGCGCATCACCTTATC-3 (SEQ ID NO: 13)'; R: 5'-AGATGTGGGTCACTCTGAAAGAATATGCT-GAAAAC-3') (SEQ ID NO: 11). All sequences aligned in nBLAST and ensured that all were from the FUR1 gene of *C. auris*. Mutation analysis revealed no variation in the sequence of the FUR1 gene using the reference sequence, GenBank Accession: CP076749 (FIG. 5). Three groups (clades) of *C. auris* were identified based on the mutation data. Two *C. auris* CA1 and CA14 are grouped as clade 1 with G534G, Y584Y, F585F, H608Y, P611S, A640V, F132Y, K143R and K152K mutations. Most of the isolates [CA2 CA3, CA4, CA5, CA6, CA7, CA8, CA10, CA11, CA12, CA13, CA15, CA16, CA17, CA18 and CA19] are in clade 2 with G534G, Y584Y, F585F, H608Y, P611S, A640V, F132Y, and K143R mutations. The remaining strain, CA9 (clade 3) was observed with G534G, Y584Y, F585F, H608Y, P611S, F132Y, and K143R mutations.

Example 14: Characterization of Synthesized Nanomaterial

Figure 6A:
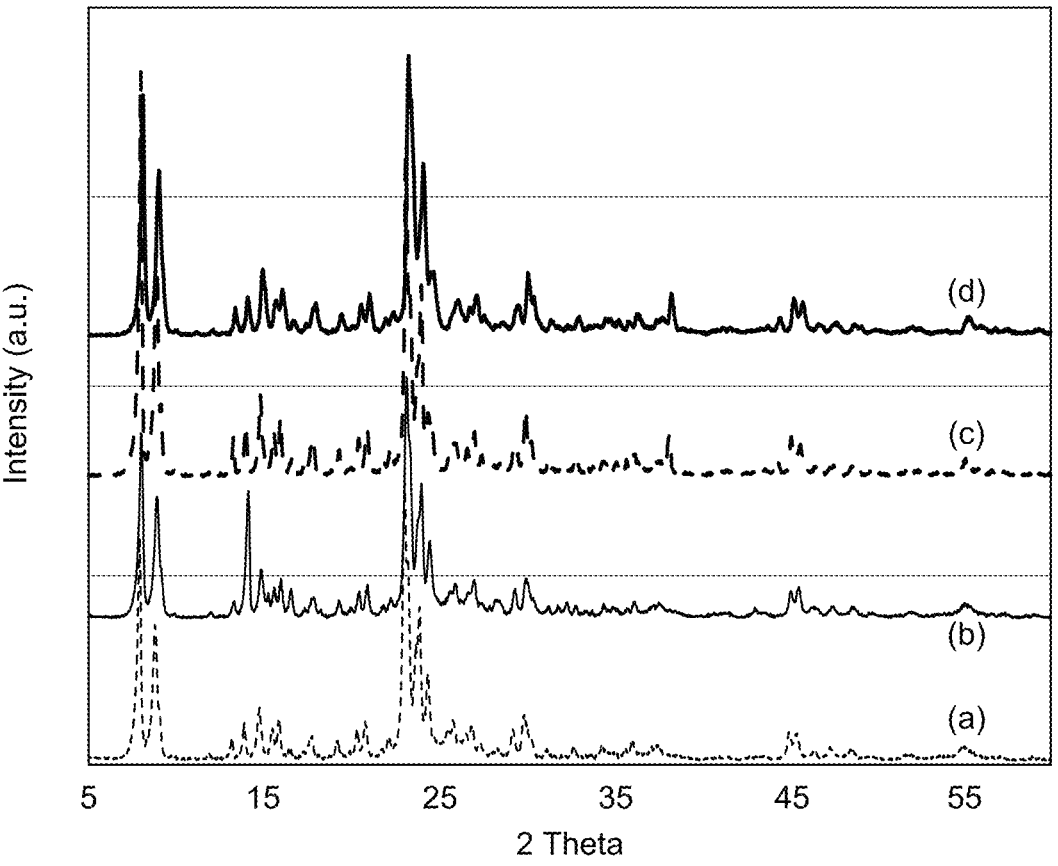
FIG. 6A shows X-ray diffraction (XRD) patterns of various nanomaterials, TiZSM-5 (a), 4 wt. % Ag/TiZSM-5 (b), Ag-silicalite-1, where Si/Ag ratio is 25 (c), and Ag-silicalite-1, where the Si/Ag ratio is 100 (d), according to certain embodiments.
Figure 6B:
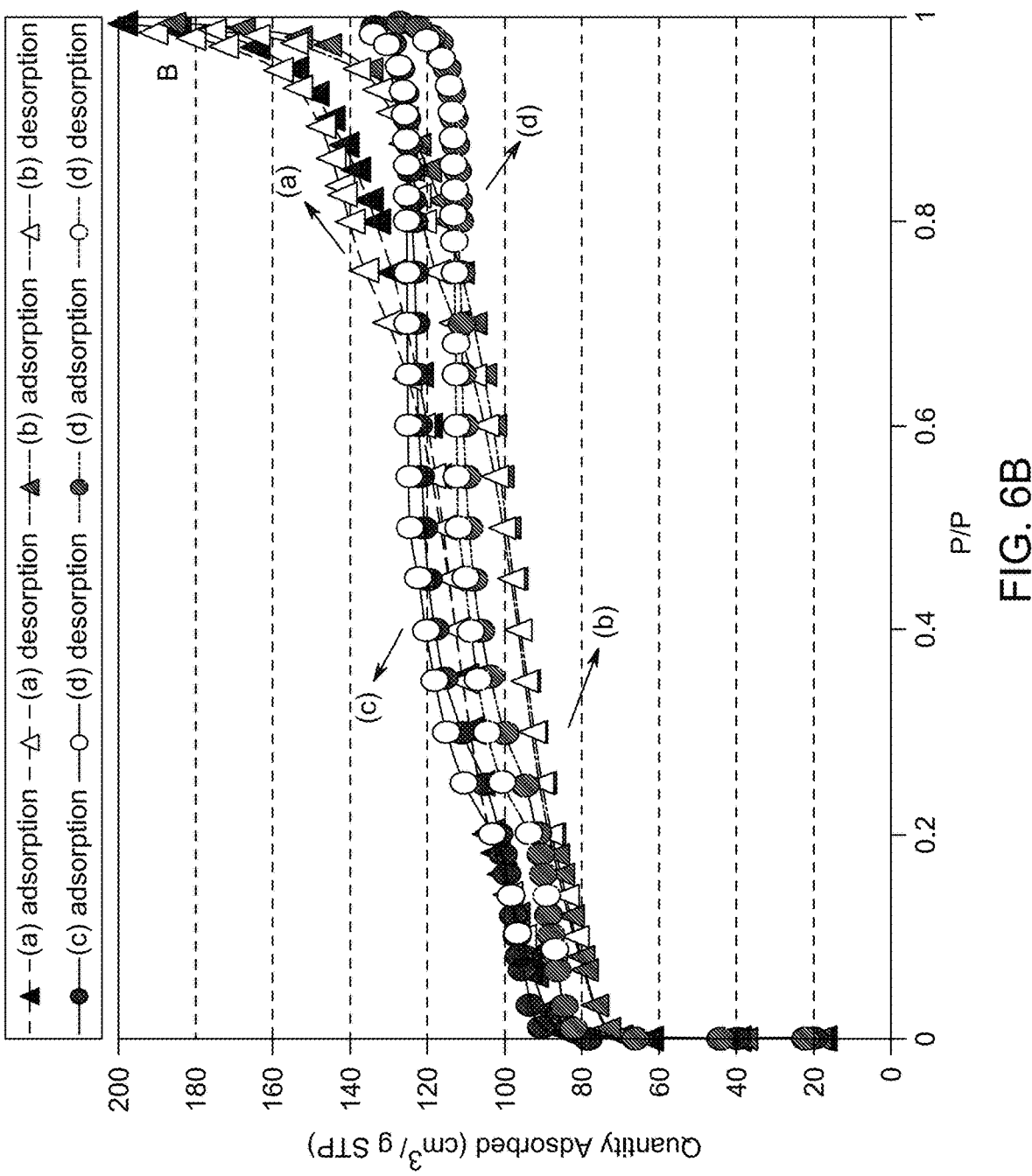
FIG. 6B shows nitrogen adsorption isotherm plots of various nanomaterials, TiZSM-5 (a), 4 wt. % Ag/TiZSM-5 (b), Ag-silicalite-1, where the Si/Ag ratio is 25 (c), and Ag-silicalite-1, where the Si/Ag ratio is 100 (d), according to certain embodiments.

FIG. 6A shows the X-ray diffraction (XRD) patterns of TiZSM-5 (a), 4 wt. % Ag/TiZSM-5 (b), Ag-silicalite-1, where the Ag/Si ratio is 25 (c), and Ag-silicalite-1, where the Ag/Si ratio is 100 (d). The analysis revealed a mordenite inverted framework (MFI) structure of ZSM-5 but with a certain level of decrease in crystallinity with metal modification. Ag-silicalite-1 showed the highest crystallinity (71%) and exhibited the presence of cubic shape of AgNPs. Textural analysis of the synthesized nanomaterials, namely, TiZSM-5 (a), 4 wt. % Ag/TiZSM-5 (b), Ag-silicalite-1— where the Ag/Si ratio is 25 (c), and Ag-silicalite-1—where the Ag/Si ratio is 100 (d), using the nitrogen adsorption-desorption technique is shown in FIG. 6B. TiZSM-5, 4 wt. % Ag/TiZSM-5, and Ag-silicalite-1 samples exhibited a type III isotherm (H3 hysteresis) at an extended relative pressure of 0.8-1.0 (FIG. 6B). Ag-silicalite-1 showed the highest BET surface area of 338 m$^2$/g with a micro surface area of 215 m$^2$/g (Table 3). Pore volume also contained the meso (0.11 cm$^3$/g) and micropore volume (0.10 cm$^3$/g) with pore size distribution centered at about 2.51 nm. In the case of 4 wt. % Ag/TiZSM-5, the impregnation of Ag reduced about 20% of the surface textures of TiZSM-5.

%), O (51.78 wt. %), Si (32.10 wt. %), Al (2.46 wt. %), and Ag (0.33 wt. %). The appearance of the Ag peak in the Ag/TiZSM-5 specimen is an indication of the possible

TABLE 3

| Textural characteristics of ZSM-5 modified samples. | | | | | | |
|---|---|---|---|---|---|---|
| Sample code | Surface area (SA) (m²/g) | t-plot Micro SA (m²/g) | Meso PV (m²/g) | Pore volume (cm³/g) | t-plot MV (cm³/g) | Meso PV (cm³/g) | PSD (nm) |
| TiZSM-5 | 329 | 161 | 168 | 0.29 | 0.08 | 0.21 | 3.55 |
| 4 wt. % Ag/TiZSM-5 | 267 | 131 | 136 | 0.26 | 0.07 | 0.19 | 3.97 |
| Ag-silicalite-1 | 338 | 215 | 123 | 0.21 | 0.1 | 0.11 | 2.51 |

Figure 6C:
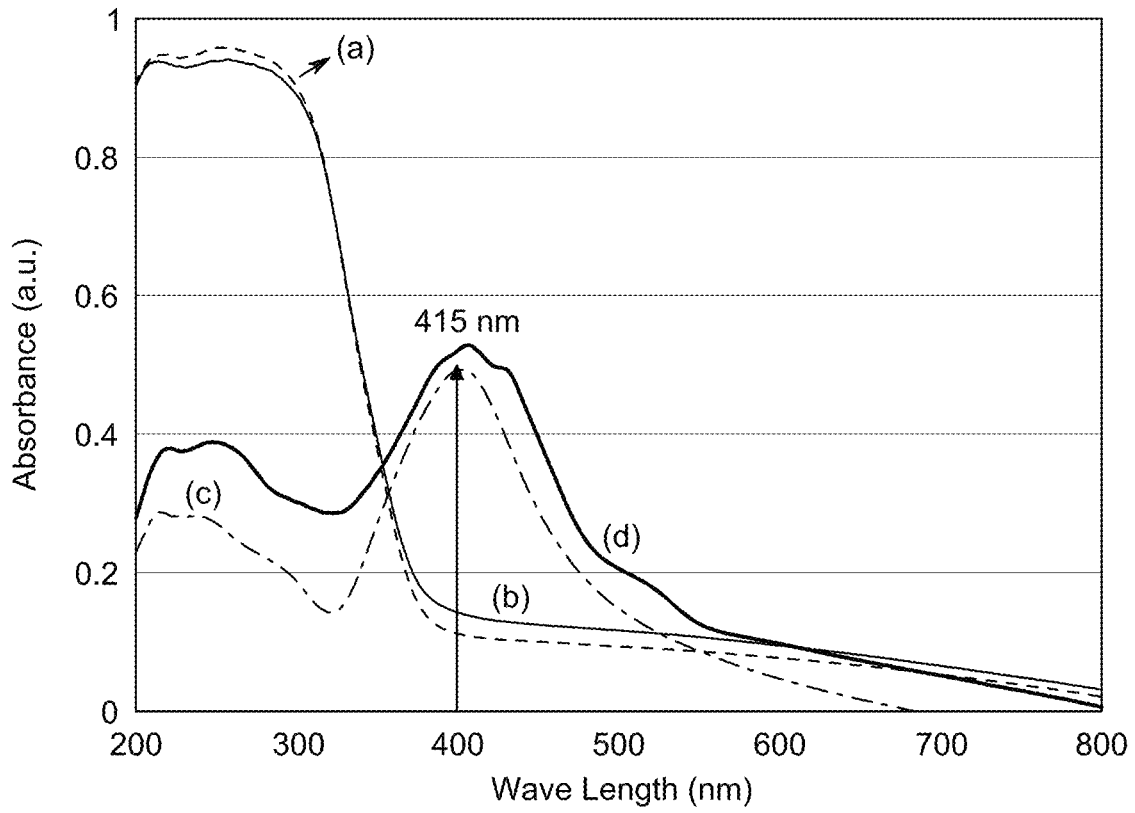
FIG. 6C shows a diffuse reflectance spectra (DRS) plot of various nanomaterials, TiZSM-5 (a), 4 wt. % Ag/TiZSM-5 (b), Ag-silicalite-1, where the Si/Ag ratio is 25 (c), and Ag-silicalite-1, where the Si/Ag ratio is 100 (d), according to certain embodiments.

The coordination of Ag on TiZSM-5 and Ag-silicalite-1 was analyzed using diffuse reflectance spectroscopy (DRS), and the results of this study are depicted in FIG. 6C. TiZSM-5 (a) showed the presence of two bands at about 215 nm and 260 nm due to the tetrahedral and octahedrally coordinated titanium species, respectively. The extending of the peak width to about 390 nm also indicates the presence of some bulk anatase species. The impregnation of 4 wt. % Ag (Ag/TiZSM-5) showed no significant changes in the absorbance bands of TiZSM-5 (b). In the case of Ag-silicalite-1 ((c) and (d)), the intensity of the band increases at about 415 nm, indicating the presence of Ag nanoparticles. Such a band is primarily attributed to the presence of free electrons giving rise to surface plasmon resonance (SPR).

Figure 6D:
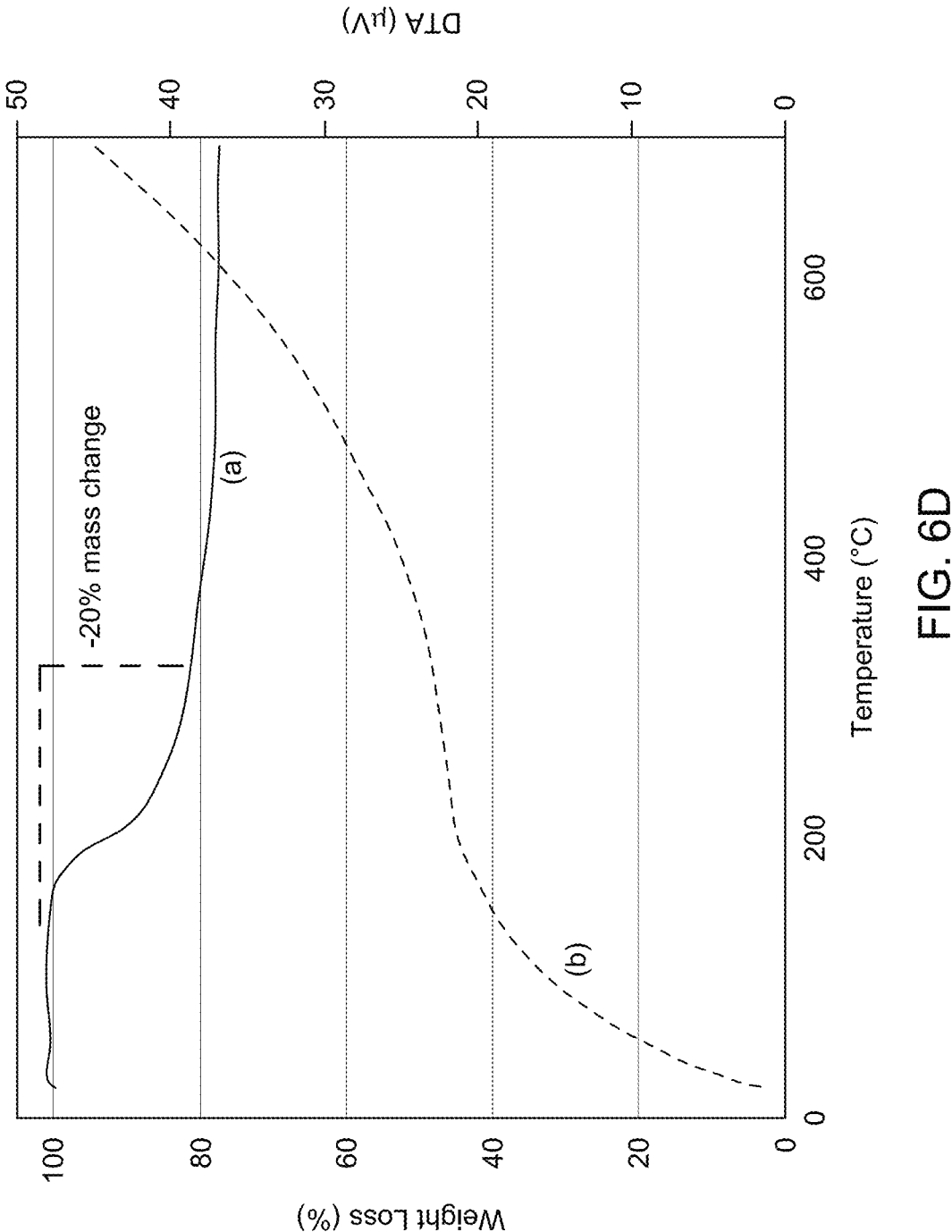
FIG. 6D shows a thermogravimetric analysis-differential thermal analysis (TGA-DTA) plot of Ag-silicalite-1, according to certain embodiments.

The TGA-DTA technique was used to study the thermal decomposition of the templated (as-synthesized) form of zeolite to determine the porous superficial composition (FIG. 6D). The TGA profile of Ag-silicalite-1 shows a gradual decomposition due to water desorption (up to 150° C.), template TPAOH (up to 350° C.) and silanol condensation to form siloxane (>350° C.). The nanomaterial synthesized using the hydrothermal process shows about 20% of the template locked inside the Ag-silicalite-1 (a). The DTA peak shows a broad decomposition peak centered between 150° C. and 700° C. associated with the thermal decomposition of TPAOH interacted with Ag-silicalite-1 (b). The template content shows the facilitation of a large surface area during the synthesis of porous silica. The present synthesis of Ag incorporated into high silica zeolite shows a high surface area of 338 m²/g, correlating with the high percentage of TPAOH loss observed in the profile of TGA-DTA.

Figure 7A:
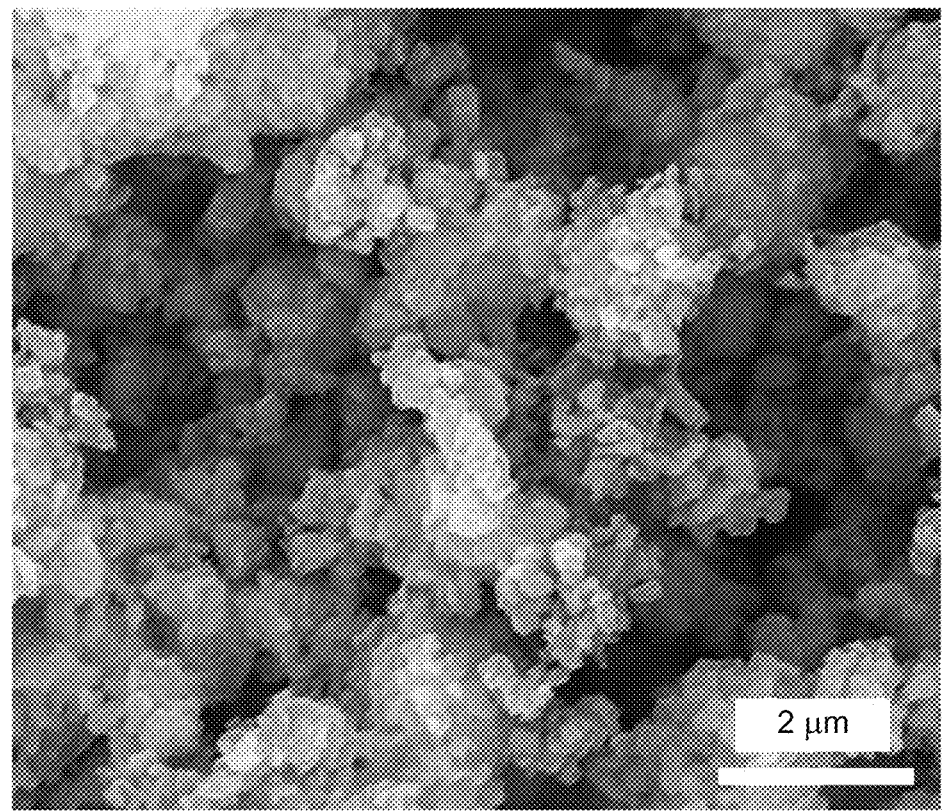
FIG. 7A depicts a scanning electron microscope (SEM) image of 4 wt. % Ag/TiZSM-5, according to certain embodiments.
Figure 7B:
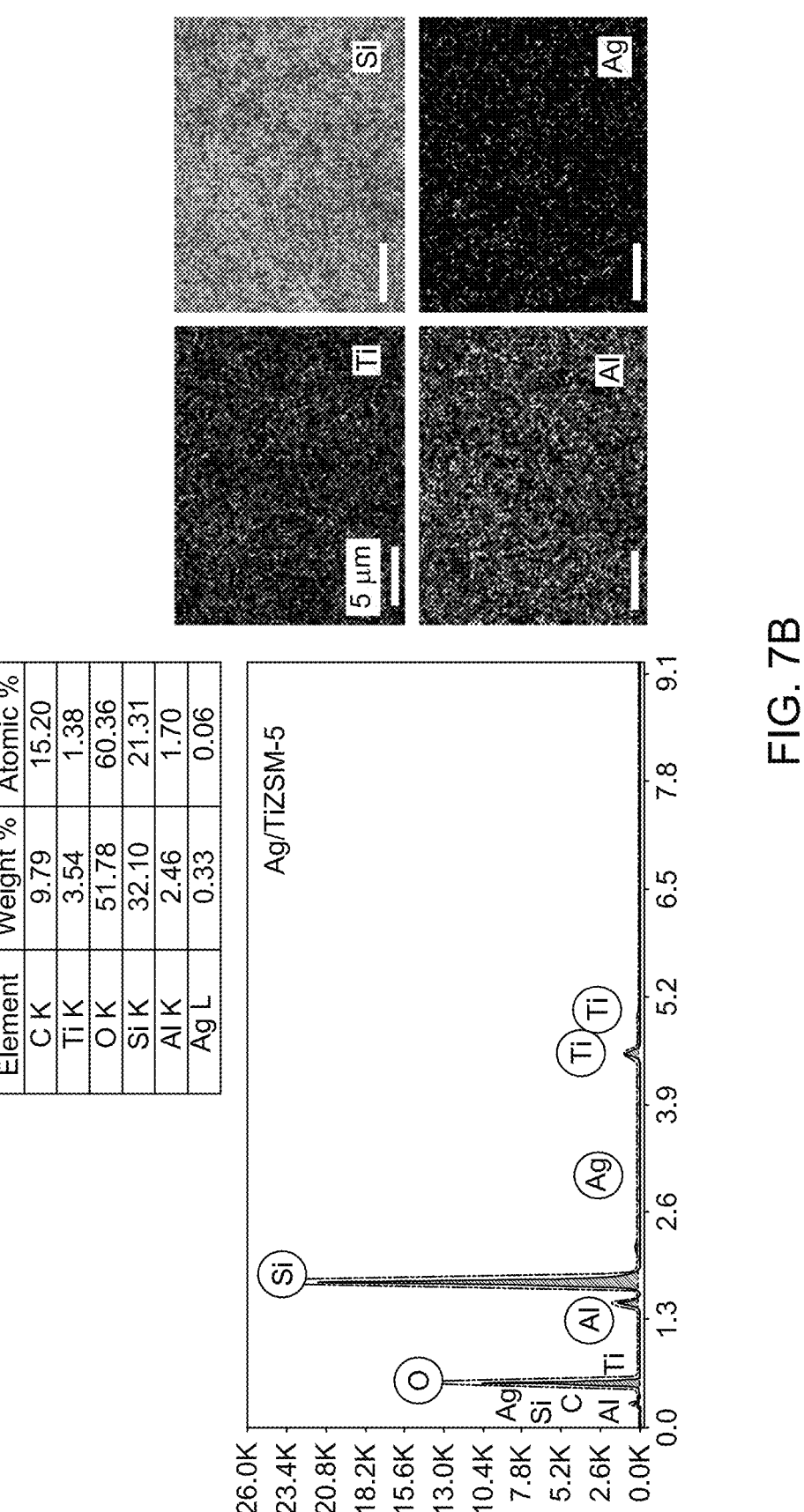
FIG. 7B shows energy-dispersive X-ray spectroscopy (EDX) spectra and EDX mapping images of 4 wt. %/TiZSM-5, according to certain embodiments.
Figure 7C:
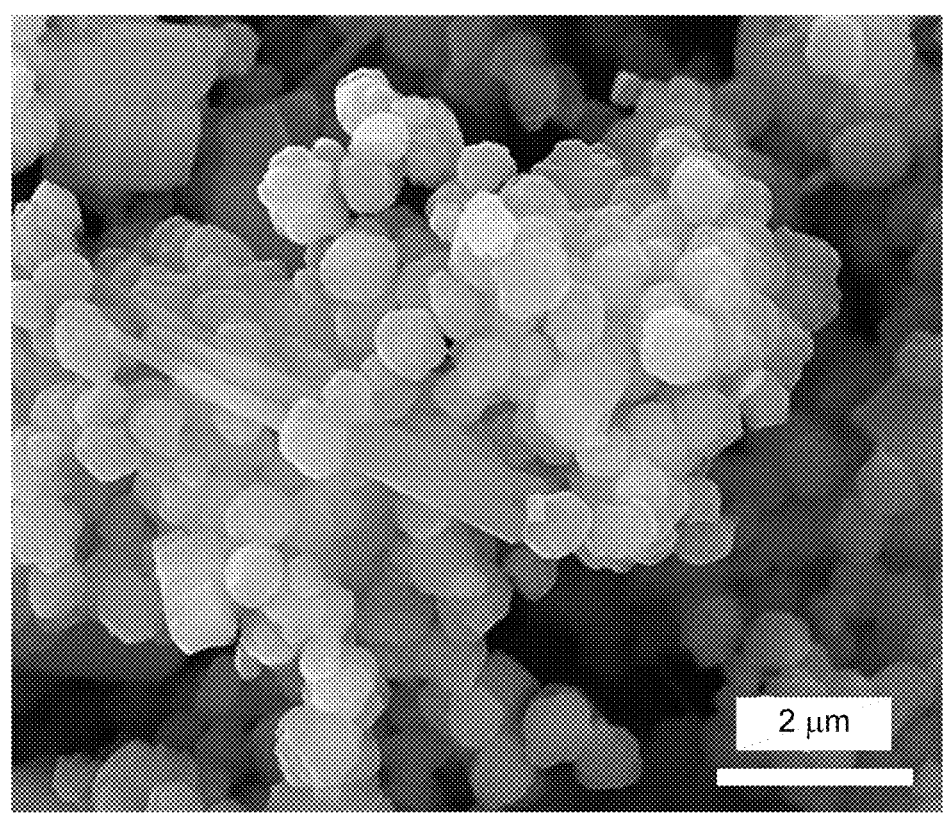
FIG. 7C depicts a SEM image of Ag-silicalite-1, according to certain embodiments.

The morphological features, chemical composition, and elemental mapping of the two prepared nanomaterials (4 wt % Ag/TiZSM-5 and Ag-silicalite-1) were analyzed using SEM/EDX (FIGS. 7A-7D). The SEM images show a different morphology of 4 wt. % Ag/TiZSM-5 and Ag-silicalite-1. The 4 wt % Ag/TiZSM-5 shows the presence of nanoclusters in the agglomerated form (FIG. 7A), while Ag-silicalite-1 shows the presence of regular-shaped crystals with average particle size in the range of 600 nm (FIG. 7C).

Figure 7D:
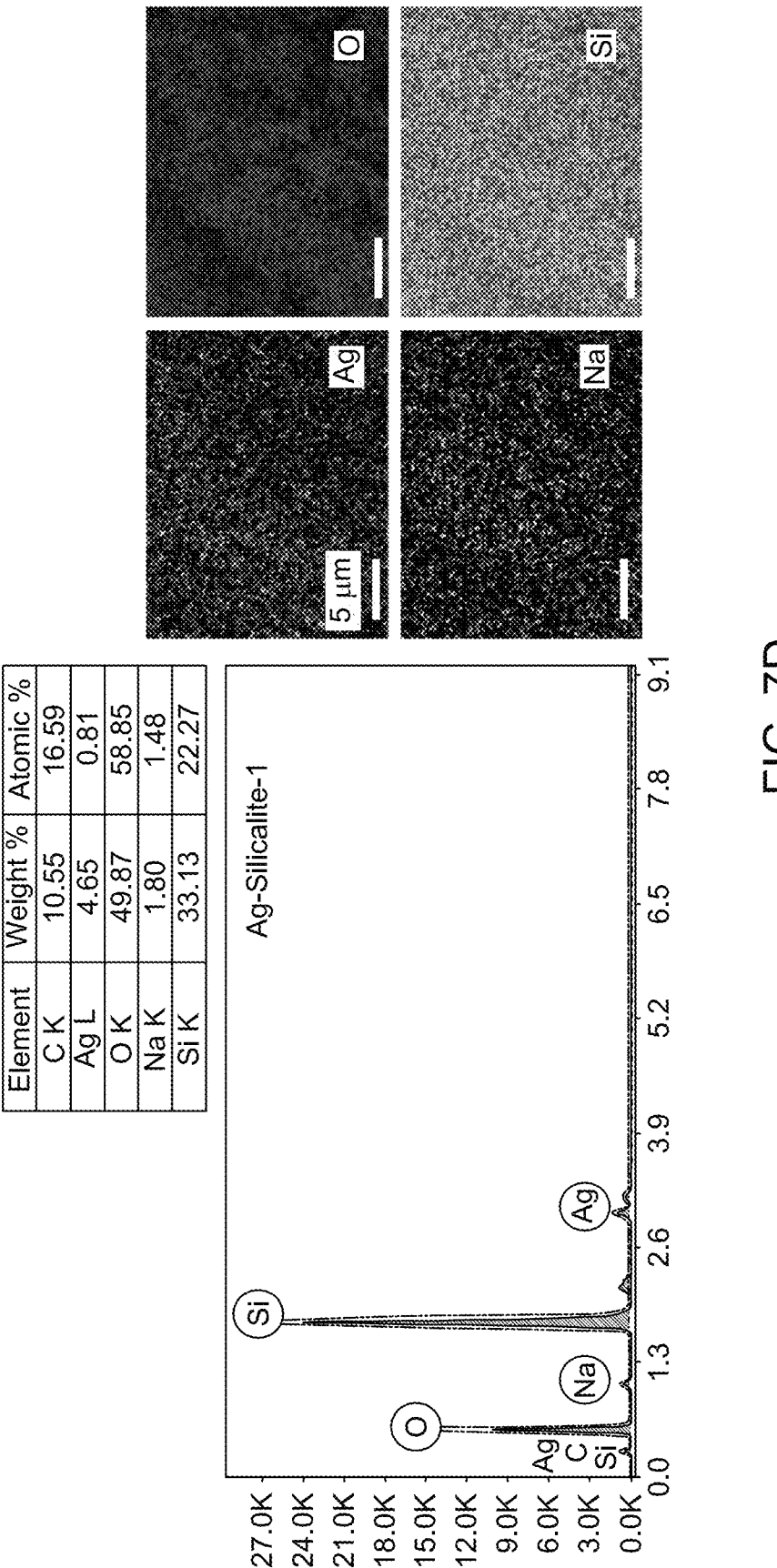
FIG. 7D shows EDX spectra and EDX mapping images of Ag-silicalite-1, according to certain embodiments.

The structural features and chemical composition of 4 wt. % Ag/TiZSM-5 and Ag-silicalite-1, as determined by EDX analysis, are shown in FIG. 7B and FIG. 7D. EDX spectra of Ag/TiZSM-5 revealed the composition is a titanium-containing aluminosilicate ZSM-5 zeolite (Ti, O, Si, Al), as can be observed in FIG. 7B. In the spectrum of 4 wt. % Ag/TiZSM-5, the presence of the Ti peak indicates the successful incorporation of Ti in the zeolite matrix. The Ag/TiZSM-5 nanocomposite is composed of Ti (3.54 wt.

impregnation of Ag nanoparticles on the zeolite matrix. The EDX spectrum of Ag-silicalite-1 is composed of Ag (4.65 wt. %), O (49.87 wt. %), Na (1.80 wt. %), and Si (33.13 wt. %), as can be observed in FIG. 7D. The existence of an Ag peak in Ag-silicalite-1 with a reasonable intensity is an indication of the comprehensive incorporation of Ag nanoparticles within the silicalite-1 matrix.

The elemental mapping examination revealed that all of the constituent elements were equally distributed throughout the specimen powder of the SEM micrographs on the carbon support. It was observed that the main elements were Si and O, and Al, which appeared very dense, indicating the homogeneous preparation of zeolite. The Ti and Ag were well distributed in 4 wt. % Ag/TiZSM, indicating the impregnation of Ag with TiZSM-5. The elemental mapping analysis of Ag-silicalite-1 highlighted the constituent elements of Ag, O, and Si, attributed to the successful incorporation of Ag nanoparticles into the silicalite-1 matrix. The EDX and elemental mapping analyses agree well with each other and support the successful preparation of 4 wt. % Ag/TiZSM-5 and Ag-silicalite-1 nanomaterials.

Figure 8A:
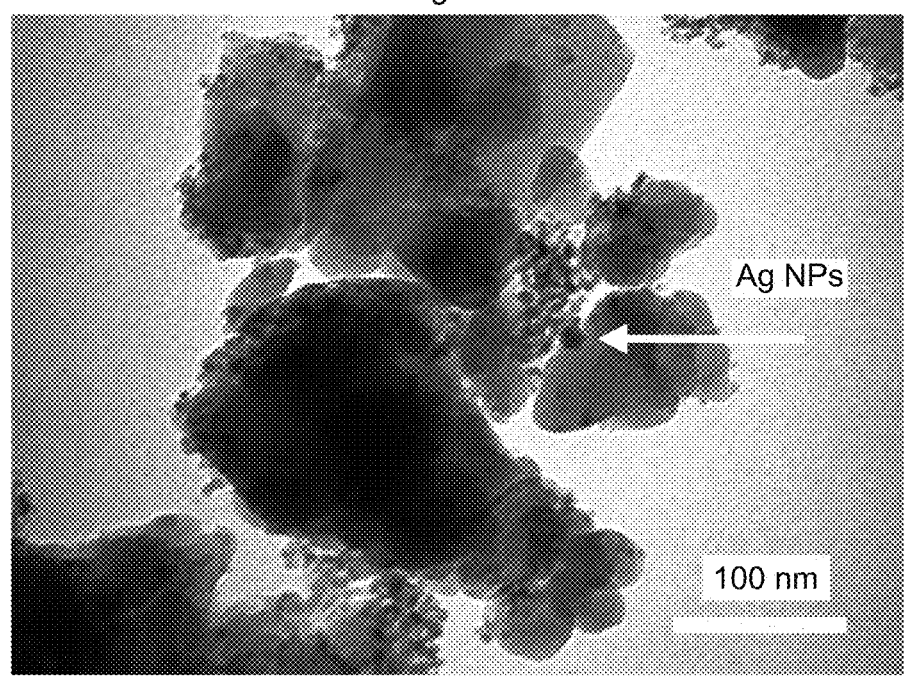
FIG. 8A and FIG. 8B show transmission electron microscope (TEM) images of 4 wt./TiZSM-5, according to certain embodiments.
Figure 8B:
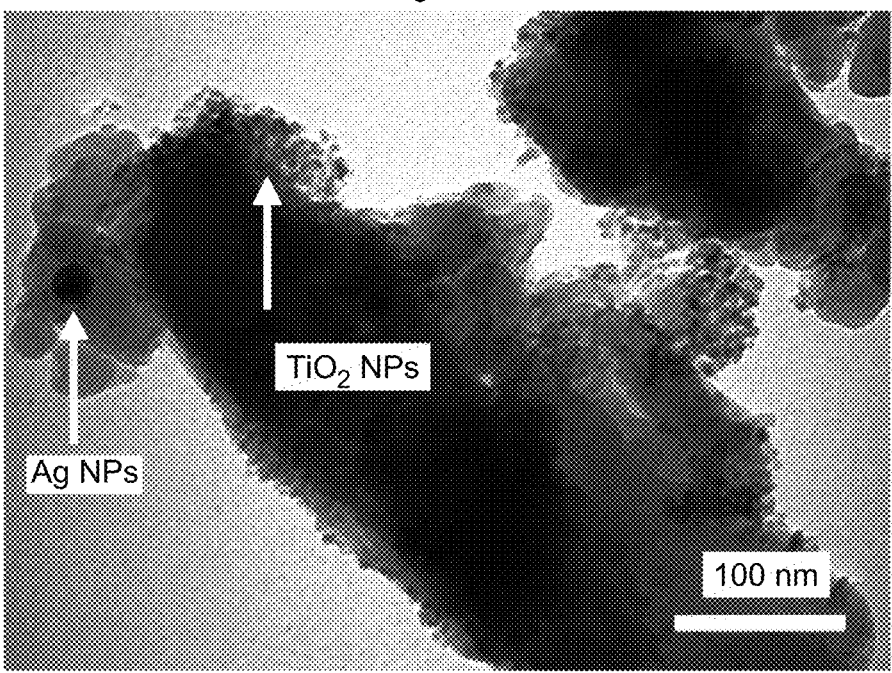
Figure 8C:
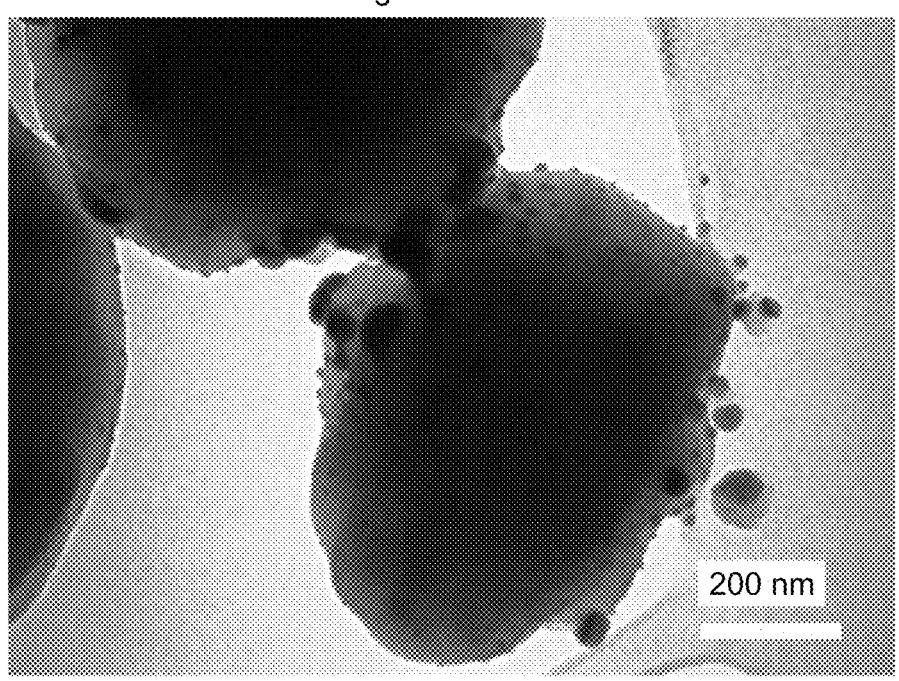
FIG. 8C and FIG. 8D show TEM images of Ag-silicalite-1, according to certain embodiments.
Figure 8D:
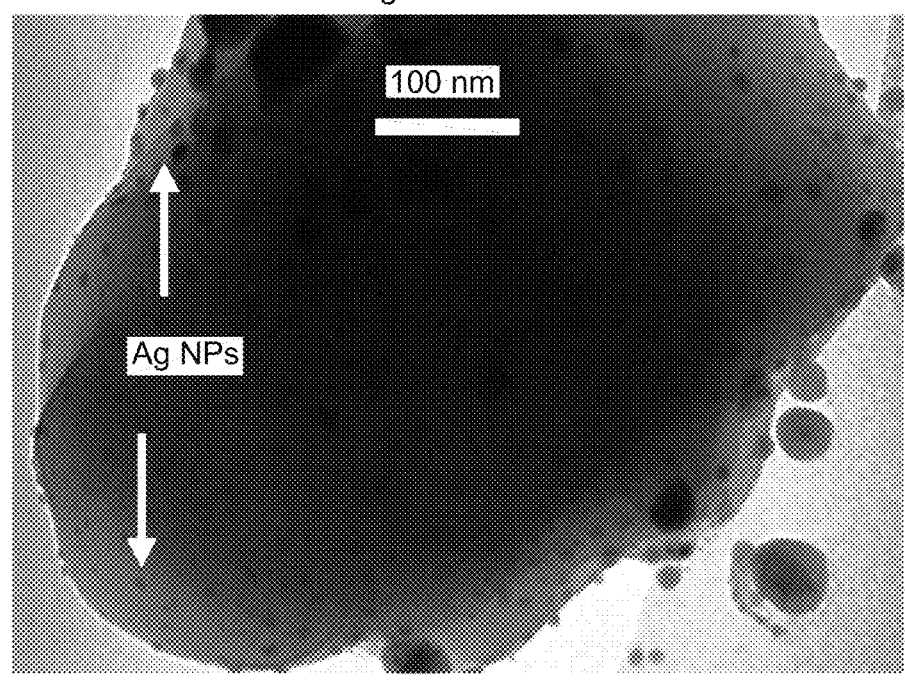

TEM analysis was carried out to examine the detailed morphology and structure of 4 wt. % Ag/TiZSM-5 and Ag-silicalite-1. The results of TEM are displayed in FIG. 8A-8D. The morphological analysis shows the intact particles of nanosized Ti and Ag in both samples. The TEM results of 4 wt % Ag/TiZSM-5 revealed the presence of nanoporous, structured, irregular-shaped cluster particles of TiZSM-5 with varied sizes of a few tens of nanometers to a few hundreds of nanometers (FIG. 8A and FIG. 8B). The Ag nanoparticles attached to the TiZSM-5 matrix are highlighted with arrows, and the size of the AgNPs was estimated at nearly 10-20 nm. TEM of Ag-silicalite-1 showed regular-shaped large silicalite-1 particles with an average size of about 600 nm (FIG. 8C and FIG. 8D). The silver nanoparticles intact within the silicalite-1 particles show the successful incorporation of Ag nanoparticles into the silicalite-1 framework.

Example 15: Biofilm Studies

The antibiofilm activity of the synthesized nanomaterials-Ti-ZSM-5, 4 wt. % Ag/ZSM-5, Ag-silicalite-1 nanomaterials, and AgNO₃ were carried out on 19 C. auris hospital strains. The obtained results showed the synthesized nanomaterials displayed potent anticandidal activity by demonstrating antibiofilm activity via CFU killing assay and antifungal effect on the planktonic cells. The biofilm CFU killing assay was performed at two periods of incubation. It was noted that both the studies at different incubations, i.e., 24 and 48 h of incubation, yielded a similar activity against the formation of biofilms after treatment with the synthesized nanomaterials. A different rate of biofilm inhibition was seen in each strain compared with its untreated counterpart (control). Irrespective of clades, all strains treated with 4 wt. % Ag/ZSM-5, Ag-silicalite-1 nanomaterial showed inhibition for both biofilms [(24 h; F=57.4079 and p=1.1102×10⁻¹⁶) (48 h; F=43.3833 and p=1.1×10⁻¹⁶) and planktonic C. auris, compared to the control conditions.

Figure 9A:
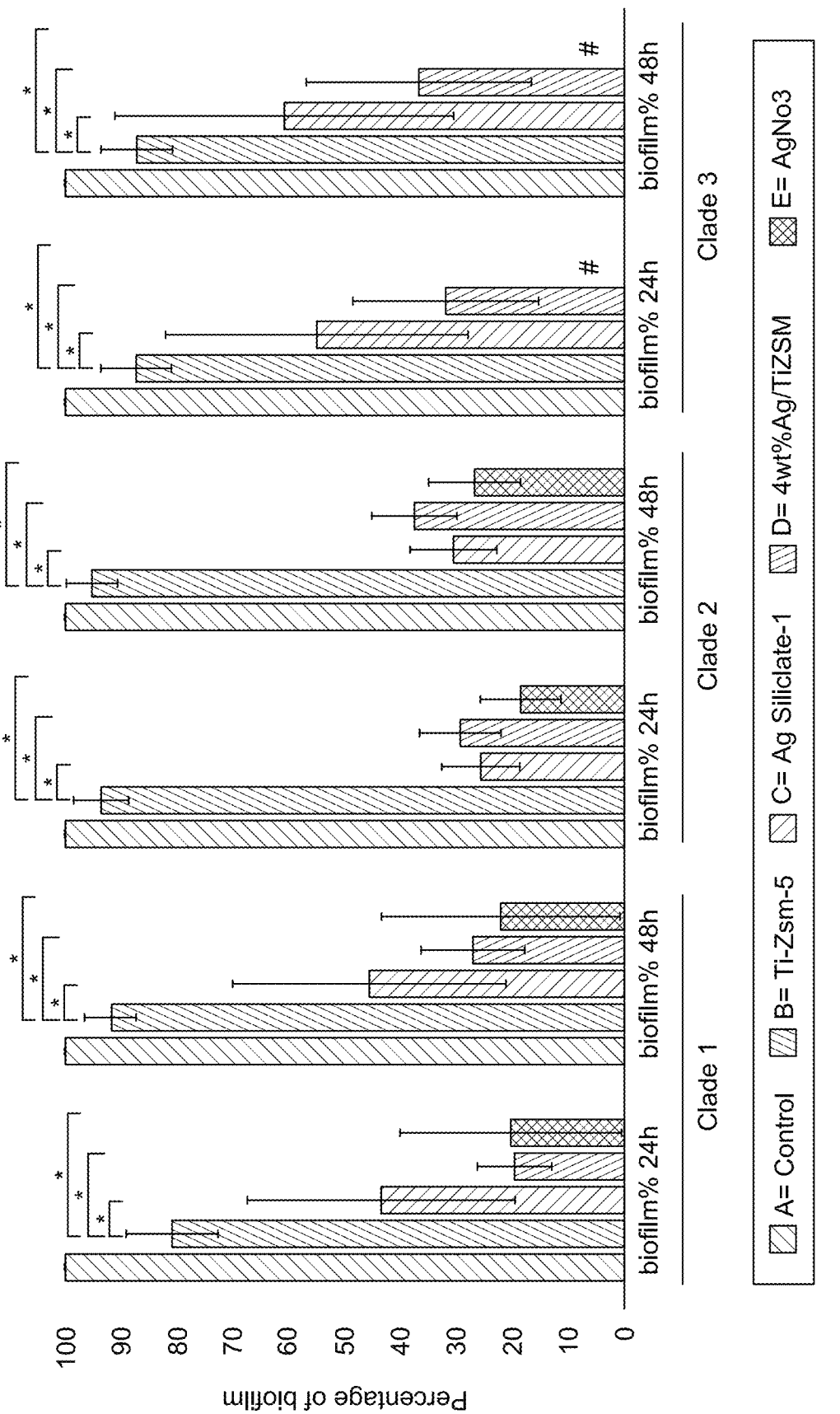
FIG. 9A is a bar graph showing effect of various nanomaterials, TiZSM-5, 4 wt. % Ag/TiZSM-5, Ag-silicalite-1, on biofilm formation in 3 clades of *C. auris* strains after 24 and 48 hour incubation period, according to certain embodiments.
Figure 9B:
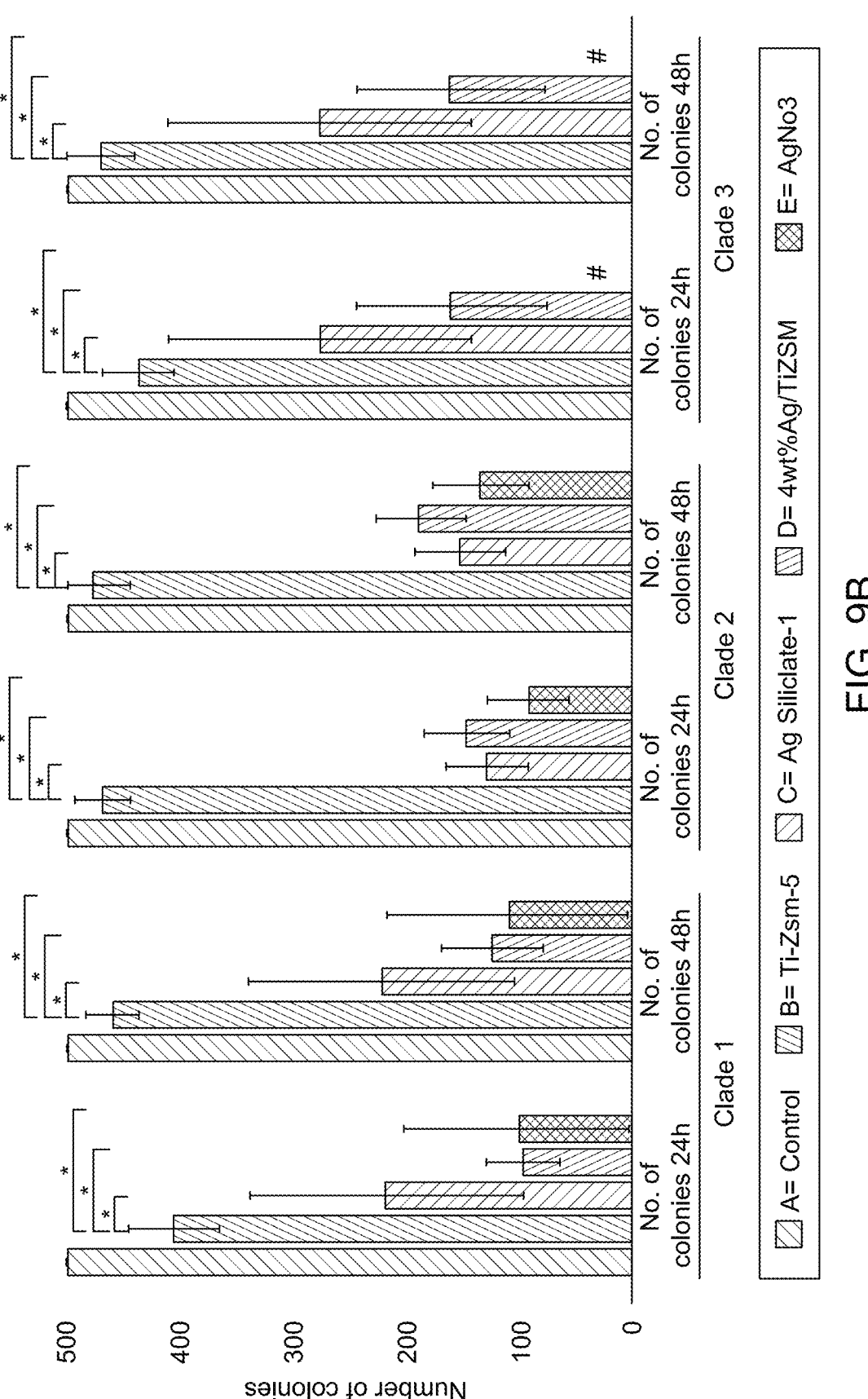
FIG. 9B is a bar graph showing effect of various nanomaterials, control (a), Ti-ZSM-5 (b), Ag-silicate-1 (c); 4 wt. % Ag/TiZSM-5 (d), and AgNO₃ (e), on planktonic cells of 3 different clades *C. auris* strains after 48 hours of incubation period, according to certain embodiments.
Figure 10A:
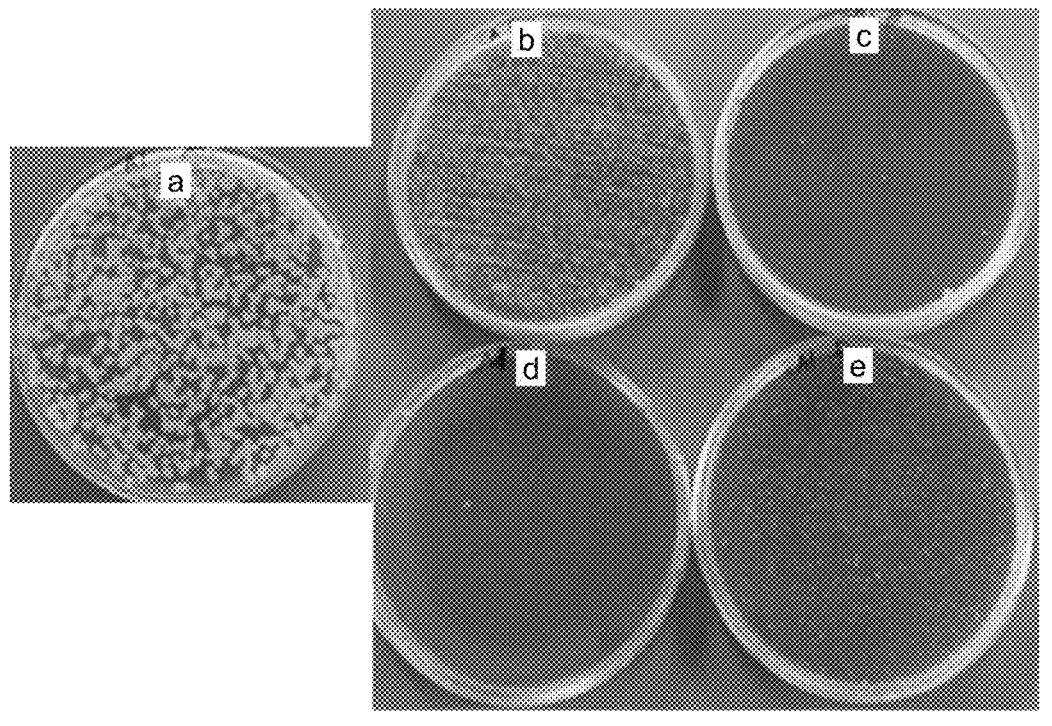
FIG. 10A is a representative agar plate image of *C. auris* strain (CA1) showing effect of various nanomaterials, control (a), Ti-ZSM-5 (b), Ag-silicate-1 (c); 4 wt. % Ag/TiZSM-5 (d), and AgNO₃ (e), on the biofilm formation technique obtained by colony forming units (CFU) technique, after 24 hours incubation, according to certain embodiments.
Figure 10B:
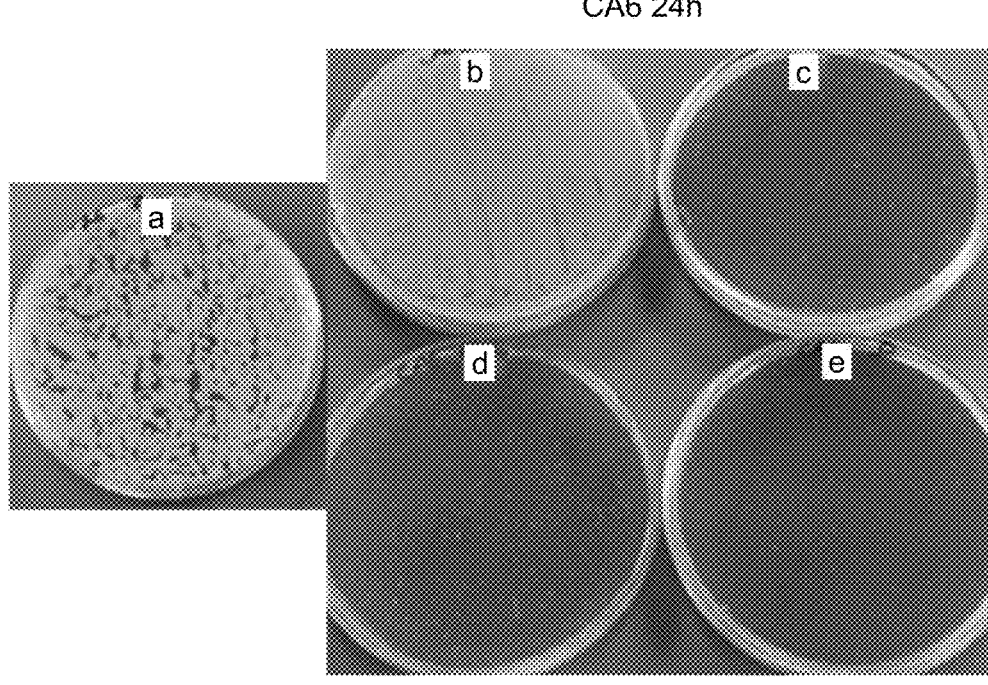
FIG. 10B is a representative agar plate image of *C. auris* strain (CA6) showing effect of various nanomaterials, control (a), Ti-ZSM-5 (b), Ag-silicate-1 (c); 4 wt. % Ag/TiZSM-5 (d), and AgNO₃ (e), on the biofilm formation technique obtained by CFU technique, after 24 hours incubation, according to certain embodiments.
Figure 10C:
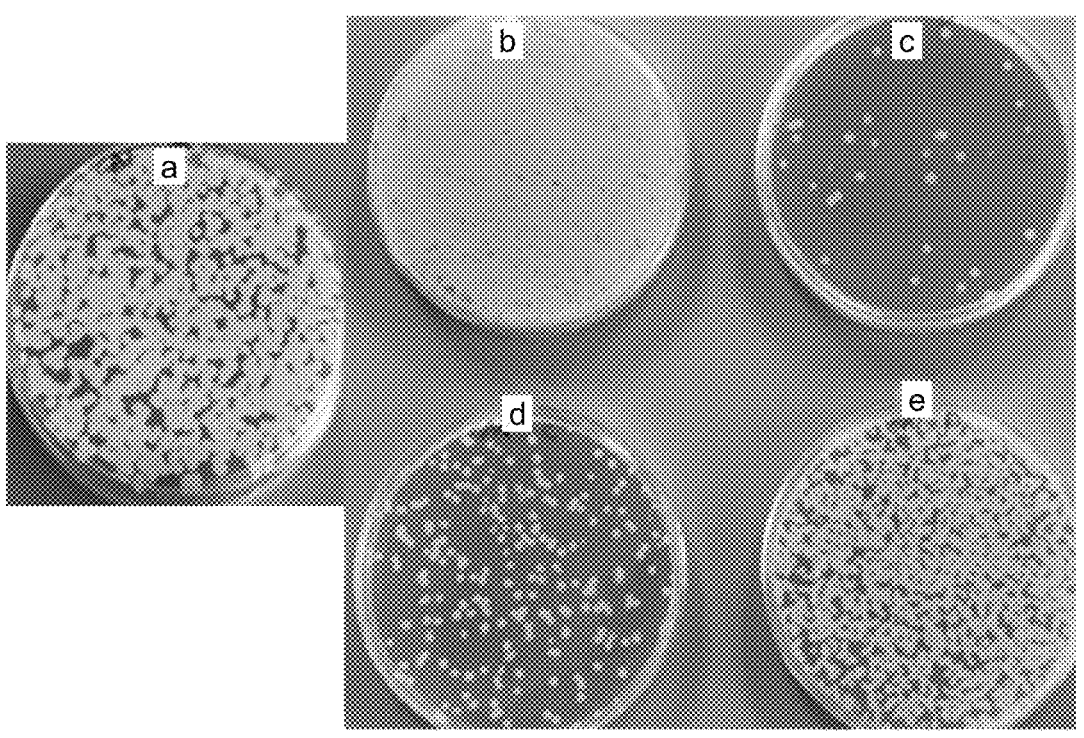
FIG. 10C is a representative agar plate image of *C. auris* strain (CA1) showing effect of various nanomaterials, control (a), Ti-ZSM-5 (b), Ag-silicate-1 (c); 4 wt. % Ag/TiZSM-5 (d), and AgNO₃ (e), on the biofilm formation technique obtained by CFU technique, after 48 hours incubation, according to certain embodiments.
Figure 10D:
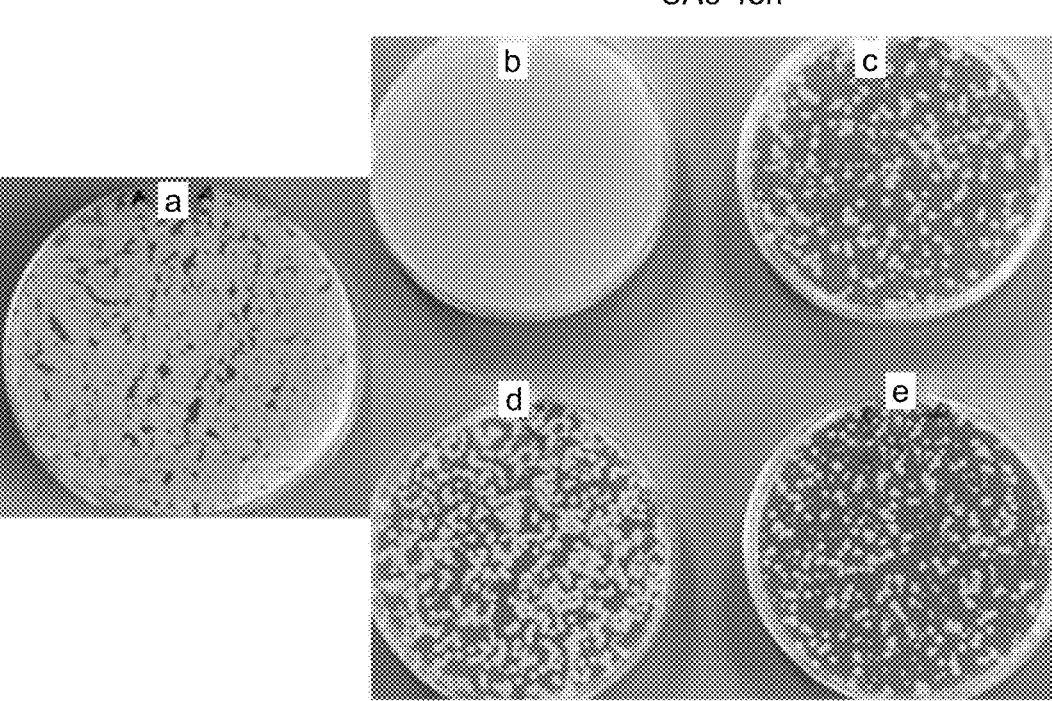
FIG. 10D is a representative agar plate image of *C. auris* strain (CA6) showing effect of various nanomaterials, control (a), Ti-ZSM-5 (b), Ag-silicate-1 (c); 4 wt. % Ag/TiZSM-5 (d), and AgNO₃ (e), on the biofilm formation technique obtained by CFU technique, after 48 hours incubation, according to certain embodiments.

Analysis of the effect of mutations on the antibiofilm activity via CFU killing assay and antifungal effect on the planktonic cells revealed no significant impact between clades 1-3. However, AgNO₃ had a complete inhibitory effect on the biofilm and the planktonic cells of the organism in clade 3, compared to the remaining two clades (clade 1 and clade 2) of the organisms (FIGS. 9A and 9B).

FIG. 10 shows the representative images of the CFU plates of two C. auris strains. FIGS. 10A and 10C are representative agar plate images of C. auris strain (CA1) showing the effect of various nanomaterials, control (a), Ti-ZSM-5 (b), Ag-silicate-1 (c); 4 wt. % Ag/TiZSM-5 (d), and AgNO₃ (e), on the biofilm formation technique obtained by CFU technique, after 24 hours and 48 hours incubation, respectively; while FIGS. 10B and 10D are representative agar plate images of C. auris strain (CA6) showing the effect of various nanomaterials, control (a), Ti-ZSM-5 (b), Ag-silicate-1 (c); 4 wt. % Ag/TiZSM-5 (d), and AgNO₃ (e), on the biofilm formation technique obtained by CFU technique, after 24 hours and 48 hours incubation, respectively.

Example 16: Morphogenesis Study by SEM

Figure 11A:
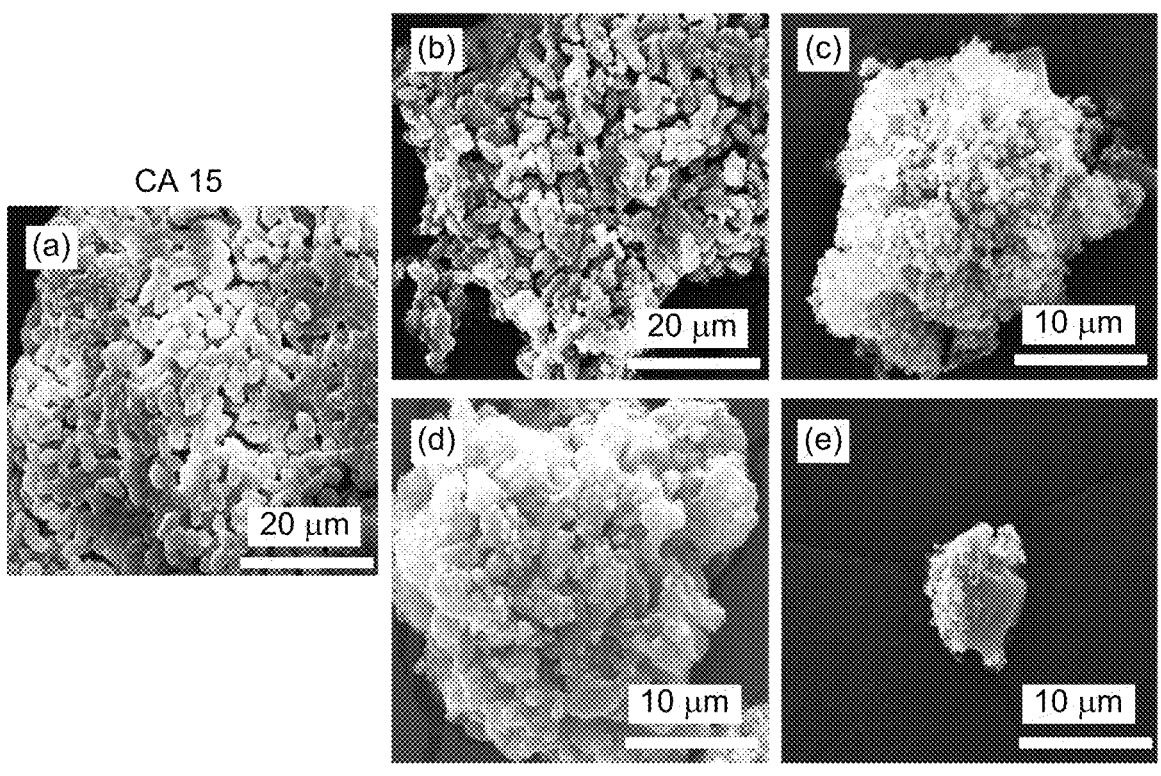
FIG. 11A shows SEM micrographs of *C. auris* strain (CA15) showing the morphogenesis effect after treatment with various nanomaterials, control (a), Ti-ZSM-5 (b), Ag-silicate-1 (c); 4 wt. % Ag/TiZSM-5 (d), and AgNO₃ (e), according to certain embodiments.
Figure 11B:
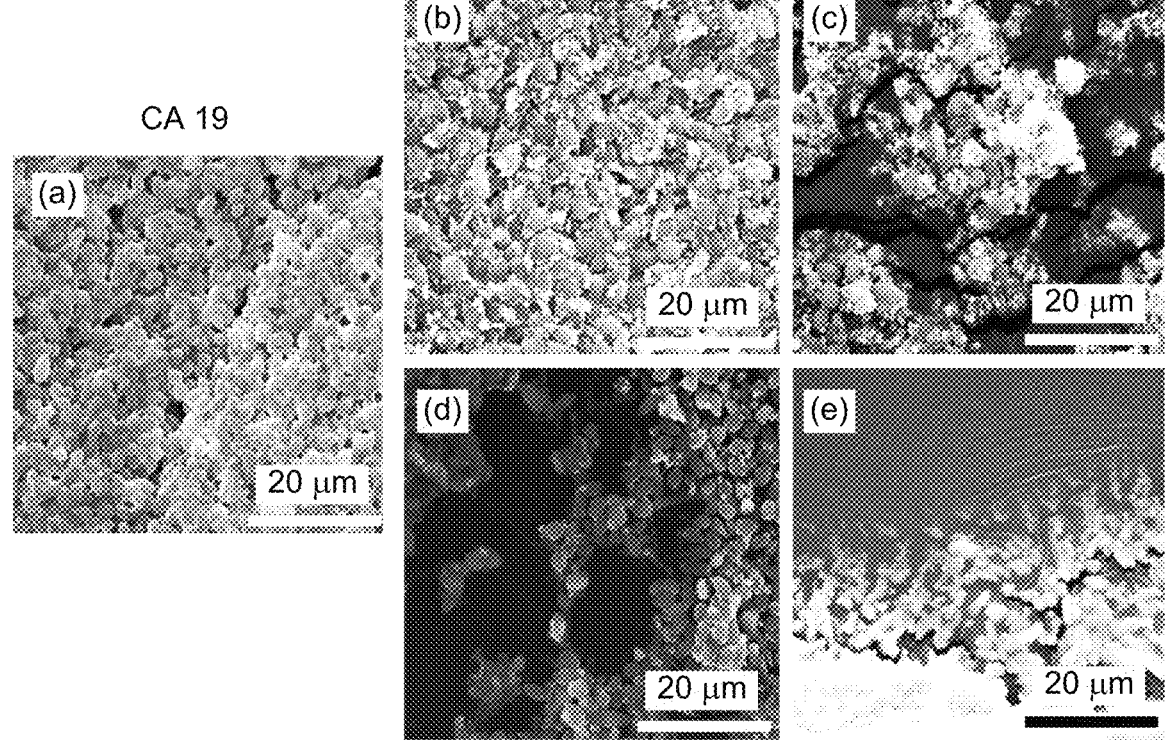
FIG. 11B shows SEM micrographs of *C. auris* strain (CA19) showing the morphogenesis effect after treatment with various nanomaterials, control (a), Ti-ZSM-5 (b), Ag-silicate-1 (c); 4 wt. % Ag/TiZSM-5 (d), and AgNO₃ (e), according to certain embodiments.

The effect of the synthesized nanomaterial was also evaluated by studying the morphogenesis of Candida cells post-treatment using SEM. Referring to FIG. 11A, SEM micrographs of C. auris strain (CA15) showing the morphogenesis effect after treatment with various nanomaterials, control (a), Ti-ZSM-5 (b), Ag-silicate-1 (c); 4 wt. % Ag/TiZSM-5 (d), and AgNO₃ (e), is depicted; and SEM micrographs of C. auris strain (CA19) showing the morphogenesis effect after treatment with various nanomaterials, control (a), Ti-ZSM-5 (b), Ag-silicate-1 (c); 4 wt. % Ag/TiZSM-5 (d), and AgNO₃ (e), is depicted in FIG. 11B. The control cells (a) had no effect and appeared normal with smooth cellular surfaces, and treatment with Ti-ZSM-5 (b) had also a negligible effect on the cellular integrity, but Ag-silicate-1 (c); 4 wt. % Ag/TiZSM-5 (d), and AgNO₃ (e) had a significant effect on the morphogenesis of cells. The nanomaterial is clearly seen attached to cell surfaces. This attachment leads to penetration, thereby causing the disruption of the cell wall and cell membrane. The gradual disruption causes the cell to lose cellular integrity and therefore causes cell death.

Example 17: Effect of Nanocomposite on Planktonic C. auris

Figure 12A:
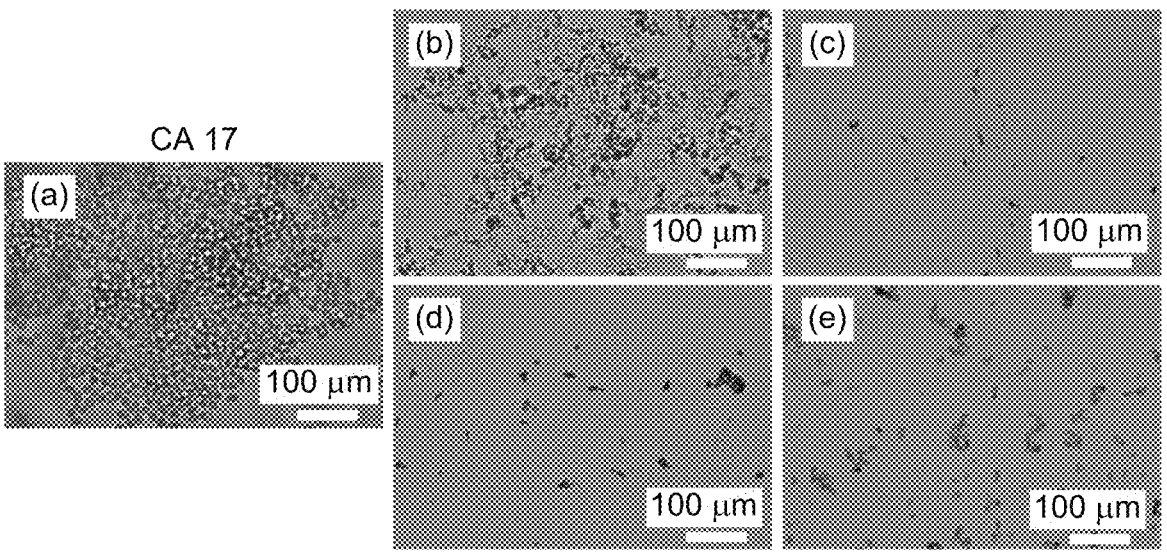
FIG. 12A shows a representative microscopic slide image of *C. auris* strain (CA17) showing the effect of various nanomaterials, control (a), Ti-ZSM-5 (b), Ag-silicate-1 (c); 4 wt. % Ag/TiZSM-5 (d), and AgNO₃ (e), on the planktonic cells using a light microscope, according to certain embodiments.
Figure 12B:
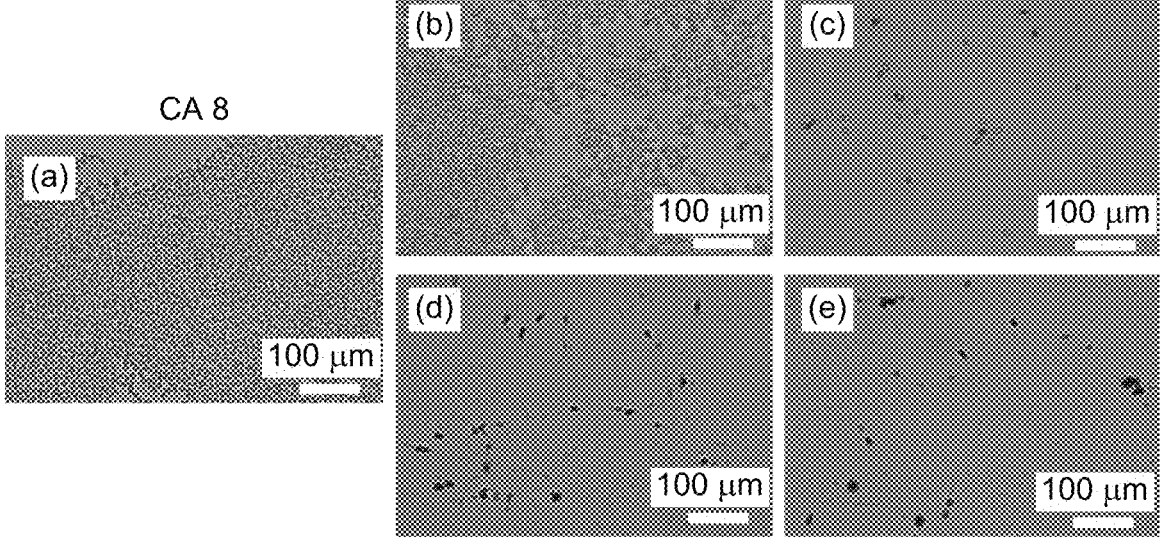
FIG. 12B shows a representative microscopic slide image of *C. auris* strain (CA8) showing the effect of various nanomaterials, control (a), Ti-ZSM-5 (b), Ag-silicate-1 (c); 4 wt. % Ag/TiZSM-5 (d), and AgNO₃ (e), on the planktonic cells using a light microscope, according to certain embodiments.

The effect on planktonic cells was evaluated by using the light microscope (Nikon H550L, Japan). FIG. 12A shows a representative microscopic slide image of C. auris strain (CA17) showing the effect of various nanomaterials, control (a), Ti-ZSM-5 (b), Ag-silicate-1 (c); 4 wt. % Ag/TiZSM-5 (d), and AgNO₃ (e), on the planktonic cells using a light microscope, and FIG. 12B shows a representative microscopic slide image of C. auris strain (CA8) showing the effect of various nanomaterials, control (a), Ti-ZSM-5 (b), Ag-silicate-1 (c); 4 wt. % Ag/TiZSM-5 (d), and AgNO₃ (e), on the planktonic cells using a light microscope. It was observed that the number of planktonic cells significantly reduced after the treatment, as can be seen in FIGS. 12A and 12B. The pattern of activity for the inhibition of planktonic C. auris cells was found similar to that of biofilm inhibition. The nanomaterial Ag-silicalite-1 and 4 wt. % Ag/TiZSM-5 showed inhibitory action against the majority of strains, compared to the untreated counterpart. However, TiZSM-5 has no inhibitory effect, as also seen in the biofilm assay. Therefore, the activity difference is primarily attributed to the dispersion state and particle size of AgNPs on silicalite-1 and TiZSM-5.

To detect the nature of AgNPs species on two supports, the XRD pattern of three samples between 2 thetas ranging between 3° and 60° was analyzed (FIGS. 6A-6C). The XRD analysis showed that Ag nanoparticle dispersion occurs on TiZSM-5 and is less than 10 nm (below the detection limit of XRD) over TiZSM-5, as can be observed in FIG. 6A (a,b). No chunks, such as Ag particles, were observed on the external surface of TiZSM-5, indicating the high dispersion state of Ag on TiZSM-5. This result correlates with the DRS of Ag/TiZSM-5 (FIG. 6C) due to the reduction in the peak attributed to Ag species with TiZSM-5 support (FIG. 6C). SEM-EDX mapping and the TEM profile show the presence of high dispersity (FIG. 7 and FIG. 8). In the case of Ag-silicalite-1, the XRD pattern confirmed that the AgNPs are crystalline in nature, FIG. 6A (c). Therefore, such crystalline AgNPs on such large crystals of Ag-silicalite-1 is shown to favor the structural and metabolic disruption in C. auris cells.

The mechanism of action of Ag-silicalite-1 nanoformulation on drug-resistant C. auris as an effective antibiofilm agent may be due to the unique properties of nanomaterials. The unique properties of nanomaterials, which include size, shape, and surface chemistry, generally produce an inhibitory action on the bacteria. It has been reported that the different sizes and shapes of nanomaterials are analogous to bacterial bio-molecular components and enhance the better connections that can be controlled through surface functionalization. Moreover, high surface-to-volume ratios of the nanomaterials and multivalent interactions are important aspects of creating antibacterial agents. Nanomaterials use multiple bactericidal routes and mechanisms, which include direct bacterial cell wall damage, and also the generation of reactive oxygen species (ROS) and binding to intracellular bacterial constituents, to kill the bacteria successfully. The mechanisms by which nanomaterials interact with bacteria may be due to their unique physicochemical properties, especially multi-valent interactions with bacterial cells. It has been suggested that Van der Waals forces, receptor-ligand, hydrophobic interactions, and electrostatic attractions play a role in nanomaterial-bacteria interfaces for robust antibacterial action.

Numerous modifications and variations of the present disclosure are possible in light of the above teachings. It is therefore to be understood that within the scope of the appended claims, the invention may be practiced otherwise than as specifically described herein.

The invention claimed is:

1. A method of reducing an amount of a *Candida auris* biofilm on a surface, comprising:

contacting a composition with the surface, wherein the composition reduces the amount of the *Candida auris* biofilm by at least 50% 24 hours after the contacting, wherein the composition comprises:

silicalite; and silver nanoparticles, wherein an atomic ratio of Si to Ag is in a range of 25:1 to 1:1, wherein particles of the composition have a spherical shape and an average size of 400-800 nm, and wherein the silver nanoparticles have been isomorphously substituted in a matrix of the silicalite.

2. The method of claim 1, wherein the composition has a surface area of 300-400 m²/g.

3. The method of claim 1, wherein the composition has a pore volume of 0.05 to 0.5 cm³/g.

4. The method of claim 1, wherein the composition has an average pore size distribution of 1-5 nm.

5. The method of claim 1, wherein the composition has both mesopores and micropores.

6. The method of claim 5, wherein the mesopores and the micropores have a pore volume ratio of 1.5:1 to 1:1.

7. The method of claim 1, wherein the composition is at least 50% crystalline.

8. The method of claim 1, wherein the composition further comprises a template.

9. The method of claim 8, wherein the composition comprises less than 20 wt. % of the template, based on a total weight of the composition.

10. The method of claim 8, wherein the template is tetrapropyl ammonium hydroxide.

11. The method of claim 1, wherein the particles of the composition are not agglomerated.

12. The method of claim 1, wherein the composition comprises 2-7 wt. % Ag, 40-60 wt. % O, 1-3 wt. % Na, 5-15 wt. % C, and 25-40 wt. % Si.

13. The method of claim 1, wherein the silver nanoparticles have a cubic crystal system.

14. The method of claim 1, wherein the silver nanoparticles are spherical and have an average diameter of 1-20 nm.

15. The method of claim 1, wherein the silver nanoparticles are not agglomerated in the composition.

16. The method of claim 1, wherein the surface is in a hospital.

17. The method of claim 1, wherein the composition reduces the amount of the *Candida auris* biofilm by at least 80% 24 hours after the contacting.

18. The method of claim 1, wherein the composition attaches to a cell surface and at least partially penetrates a *Candida auris* cell.

19. The method of claim 1, wherein the composition is made by:

adding silica in an alkaline solution to form a first solution;

adding a silver salt into the first solution to form a second solution;

adding a template into the second solution to form a third solution;

hydrothermally treating the third solution for 10-100 hours to form a precipitate; and filtering, drying and calcining the precipitate to obtain the composition.

\* \* \* \* \*

SEQUENCE LISTING

Sequence total quantity: 30
SEQ ID NO: 1            moltype = DNA   length = 31
FEATURE                Location/Qualifiers
source                 1..31
                       mol_type = other DNA
                       organism = synthetic construct
SEQUENCE: 1
gtctgcaagt cgtaacaagg tttcactgta g                                      31

SEQ ID NO: 2            moltype = DNA   length = 23
FEATURE                Location/Qualifiers
source                 1..23
                       mol_type = other DNA
                       organism = synthetic construct
SEQUENCE: 2
aaggaaaggt ccagccggac cag                                               23

SEQ ID NO: 3            moltype = DNA   length = 22
FEATURE                Location/Qualifiers
source                 1..22
                       mol_type = other DNA
                       organism = synthetic construct
SEQUENCE: 3
attttgcata cacactgatt tg                                                22

SEQ ID NO: 4            moltype = DNA   length = 22
FEATURE                Location/Qualifiers
source                 1..22
                       mol_type = other DNA
                       organism = synthetic construct
SEQUENCE: 4
cgtgcaagct gtaattttgt ga                                                22

SEQ ID NO: 5            moltype = DNA   length = 23
FEATURE                Location/Qualifiers
source                 1..23
                       mol_type = other DNA
                       organism = synthetic construct
SEQUENCE: 5
aggaattcct agtaagcgca agt                                               23

SEQ ID NO: 6            moltype = DNA   length = 21
FEATURE                Location/Qualifiers
source                 1..21
                       mol_type = other DNA
                       organism = synthetic construct
SEQUENCE: 6
atttaccacc cacttagagc t                                                 21

SEQ ID NO: 7            moltype = DNA   length = 23
FEATURE                Location/Qualifiers
source                 1..23
                       mol_type = other DNA
                       organism = synthetic construct
SEQUENCE: 7
atggccttga aggactgcat cgt                                               23

SEQ ID NO: 8            moltype = DNA   length = 30
FEATURE                Location/Qualifiers
source                 1..30
                       mol_type = other DNA
                       organism = synthetic construct
SEQUENCE: 8
ttagtaaaca caagtctctc ttttctccca                                       30

SEQ ID NO: 9            moltype = DNA   length = 24
FEATURE                Location/Qualifiers
source                 1..24
                       mol_type = other DNA
                       organism = synthetic construct
SEQUENCE: 9
acgtggagat gagtcacaga acgg                                              24

SEQ ID NO: 10           moltype = DNA   length = 31
FEATURE                Location/Qualifiers
source                 1..31
                       mol_type = other DNA
                       organism = synthetic construct -continued

```
SEQUENCE: 10
tgatccacga gctttagcgc atcaccttat c                                        31

SEQ ID NO: 11          moltype = DNA   length = 35
FEATURE                Location/Qualifiers
source                 1..35
                       mol_type = other DNA
                       organism = synthetic construct
SEQUENCE: 11
agatgtgggt cactctgaaa gaatatgctg aaaac                                    35

SEQ ID NO: 12          moltype = DNA   length = 22
FEATURE                Location/Qualifiers
source                 1..22
                       mol_type = other DNA
                       organism = synthetic construct
SEQUENCE: 12
cgtgcaagct gtaattttgt ga                                                  22

SEQ ID NO: 13          moltype = DNA   length = 31
FEATURE                Location/Qualifiers
source                 1..31
                       mol_type = other DNA
                       organism = synthetic construct
SEQUENCE: 13
tgatccacga gctttagcgc atcaccttat c                                        31

SEQ ID NO: 14          moltype = DNA   length = 31
FEATURE                Location/Qualifiers
source                 1..31
                       mol_type = other DNA
                       organism = synthetic construct
SEQUENCE: 14
cacctctctt aacggtgaat taagaatata t                                        31

SEQ ID NO: 15          moltype = DNA   length = 32
FEATURE                Location/Qualifiers
source                 1..32
                       mol_type = other DNA
                       organism = synthetic construct
SEQUENCE: 15
cacctctctt aacggcgaac ttaagaatat at                                       32

SEQ ID NO: 16          moltype = DNA   length = 32
FEATURE                Location/Qualifiers
source                 1..32
                       mol_type = other DNA
                       organism = synthetic construct
SEQUENCE: 16
ccagcttgcc tattttttcc agctcatgac ca                                       32

SEQ ID NO: 17          moltype = DNA   length = 32
FEATURE                Location/Qualifiers
source                 1..32
                       mol_type = other DNA
                       organism = synthetic construct
SEQUENCE: 17
ccagcttgcc tacttcttcc agctcatgac ca                                       32

SEQ ID NO: 18          moltype = DNA   length = 32
FEATURE                Location/Qualifiers
source                 1..32
                       mol_type = other DNA
                       organism = synthetic construct
SEQUENCE: 18
tacccctcct catgaaaacc cacagtacag aa                                       32

SEQ ID NO: 19          moltype = DNA   length = 32
FEATURE                Location/Qualifiers
source                 1..32
                       mol_type = other DNA
                       organism = synthetic construct
SEQUENCE: 19
tacccctcct tatgaaaact cacagtacag aa                                       32

SEQ ID NO: 20          moltype = DNA   length = 32
FEATURE                Location/Qualifiers
source                 1..32
                       mol_type = other DNA
```

-continued

```
                          organism = synthetic construct
SEQUENCE: 20
gtgtctcgtt cttcgccatg aactggataa tt                                    32

SEQ ID NO: 21            moltype = DNA   length = 32
FEATURE                  Location/Qualifiers
source                   1..32
                         mol_type = other DNA
                         organism = synthetic construct
SEQUENCE: 21
gtgtctcgtt cttcgtcatg aactggataa tt                                    32

SEQ ID NO: 22            moltype = DNA   length = 49
FEATURE                  Location/Qualifiers
source                   1..49
                         mol_type = other DNA
                         organism = synthetic construct
SEQUENCE: 22
tggaagaagc catcattgaa tgtcatggcg gacacaagta caagggagc                  49

SEQ ID NO: 23            moltype = DNA   length = 43
FEATURE                  Location/Qualifiers
source                   1..43
                         mol_type = other DNA
                         organism = synthetic construct
SEQUENCE: 23
caagttcttg ggcaaaattt gtggcgtctc gattgtcaga gct                        43

SEQ ID NO: 24            moltype = AA   length = 10
FEATURE                  Location/Qualifiers
source                   1..10
                         mol_type = protein
                         organism = synthetic construct
SEQUENCE: 24
TSLNGELKNI                                                             10

SEQ ID NO: 25            moltype = AA   length = 9
FEATURE                  Location/Qualifiers
source                   1..9
                         mol_type = protein
                         organism = synthetic construct
SEQUENCE: 25
QLAFFQLMT                                                               9

SEQ ID NO: 26            moltype = AA   length = 10
FEATURE                  Location/Qualifiers
source                   1..10
                         mol_type = protein
                         organism = synthetic construct
SEQUENCE: 26
TPPHENPQYR                                                             10

SEQ ID NO: 27            moltype = AA   length = 11
FEATURE                  Location/Qualifiers
source                   1..11
                         mol_type = protein
                         organism = synthetic construct
SEQUENCE: 27
SVSFFAMNWI I                                                           11

SEQ ID NO: 28            moltype = AA   length = 5
FEATURE                  Location/Qualifiers
source                   1..5
                         mol_type = protein
                         organism = synthetic construct
SEQUENCE: 28
GRSHH                                                                   5

SEQ ID NO: 29            moltype = AA   length = 10
FEATURE                  Location/Qualifiers
source                   1..10
                         mol_type = protein
                         organism = synthetic construct
SEQUENCE: 29
MSWRTQVQGS                                                             10

SEQ ID NO: 30            moltype = AA   length = 14
FEATURE                  Location/Qualifiers
source                   1..14
```

-continued

```
                      mol_type = protein
                      organism = synthetic construct
SEQUENCE: 30
QVLGQNLWRL DCQS                                                    14
```